US010313543B2

(12) United States Patent
Sato et al.

(10) Patent No.: US 10,313,543 B2
(45) Date of Patent: Jun. 4, 2019

(54) IMAGE SCANNING APPARATUS, AND METHOD AND COMPUTER-READABLE MEDIUM THEREFOR

(71) Applicant: BROTHER KOGYO KABUSHIKI KAISHA, Nagoya, Aichi (JP)

(72) Inventors: Seiya Sato, Mie (JP); Shuichi Sunako, Ichinomiya (JP); Sayaka Fujiwara, Toyoake (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/872,235

(22) Filed: Jan. 16, 2018

(65) Prior Publication Data

US 2018/0213101 A1    Jul. 26, 2018

(30) Foreign Application Priority Data

Jan. 24, 2017  (JP) ................................. 2017-010089

(51) Int. Cl.
*H04N 1/00* (2006.01)
*H04N 1/028* (2006.01)
(52) U.S. Cl.
CPC ..... *H04N 1/00745* (2013.01); *H04N 1/00716* (2013.01); *H04N 1/0281* (2013.01); *H04N 2201/0081* (2013.01)
(58) Field of Classification Search
CPC .............. H04N 1/00745; H04N 1/0281; H04N 1/00716; H04N 2201/0081
USPC ....................................................... 358/488
See application file for complete search history.

(56) References Cited

U.S. PATENT DOCUMENTS

| 5,353,052 A * | 10/1994 | Suzuki ................. B41J 2/16588 347/19 |
| 5,414,522 A | 5/1995 | Moriya |
| 5,896,183 A * | 4/1999 | Terk ...................... H01Q 23/00 348/706 |
| 6,879,096 B1 * | 4/2005 | Miyazaki ............. G09G 3/2011 313/292 |
| 8,682,183 B2 * | 3/2014 | Tanaka ................. G03G 15/065 399/27 |

FOREIGN PATENT DOCUMENTS

| JP | H05-48837 A | 2/1993 |
| JP | 2004-328154 A | 11/2004 |

* cited by examiner

*Primary Examiner* — Allen H Nguyen
(74) *Attorney, Agent, or Firm* — Scully, Scott, Murphy & Presser, PC

(57) ABSTRACT

An image scanning apparatus includes a controller configured to acquire image data by scanning a document and a particular range of a document pressing surface, detect black edge positions by detecting, from the image data, black pixels having gradation values less than a white gradation value, determine a sheet type of the document based on the gradation values of the black pixels, detect white edge positions by detecting, from the image data, white pixels having gradation values equal to or more than the white gradation value. The controller is further configured to, when the sheet type is a thin paper, detect, as the white pixels, pixels having gradation values equal to or more than a first threshold, and when the sheet type is a thick paper, detect, as the white pixels, pixels having gradation values equal to or more than a second threshold.

18 Claims, 19 Drawing Sheets

IMAGE SCANNING APPARATUS, AND METHOD AND COMPUTER-READABLE MEDIUM THEREFOR

CROSS-REFERENCE TO RELATED APPLICATION

This application claims priority under 35 U.S.C. § 119 from Japanese Patent Application No. 2017-010089 filed on Jan. 24, 2017. The entire subject matter of the application is incorporated herein by reference.

BACKGROUND

Technical Field

Aspects of the present disclosure are related to an image scanning apparatus, and a method and a computer-readable medium therefor.

Related Art

An image scanning apparatus has been known that is configured to detect a leading end or a trailing end of a document sheet in a sub scanning direction from a scanned image of the document sheet. The known apparatus may acquire the scanned image by scanning the document sheet while changing a relative position of an image scanner having a plurality of light receiving elements arranged in line along a main scanning direction, with respect to the document sheet in the sub scanning direction.

The known apparatus may determine whether each individual pixel of the scanned image has a value representing a white color (i.e., a background color of the document sheet). Thereby, the known apparatus may detect positions of pixels not representing the white color, as positions of the trailing end of the document sheet. Near the trailing end of the document sheet, light emitted by a light source is interrupted due to the thickness of the document sheet, and a short shadow emerges as an "edge." Thus, the known apparatus may detect the trailing end of the document sheet by detecting the edge.

SUMMARY

Suppose for instance that an attempt to detect the leading end of the document sheet is made using the known apparatus. In this case, the light is emitted in a single direction from the light source toward the document sheet, without being interrupted near the leading end of the document sheet. Hence, the known apparatus may not detect an edge at the leading end of the document sheet where a short shadow does not emerge.

When the known apparatus scans a leading end and a trailing end of a document sheet having a white background and a white end face that defines the thickness of the sheet, by an image scanner to emit light onto the sheet in a single direction, a "white edge" (i.e., a white bright area) is produced at a particular end, at which a short shadow does not emerge, of the leading end and the trailing end, in the scanned image of the sheet. Specifically, in a state where the document sheet is held by a white document holder, the light is emitted in such a direction that a short shadow does not emerge near the particular end of the document sheet having the white background. In this case, since the end face of the document sheet is as white as the background color of the sheet, when the image scanner receives reflected light from the end face onto which the light is incident, the white edge, which is whiter and brighter than the background color of the sheet, is formed. Thus, by detecting the white edge and a short shadow, both the leading end and the trailing end of the document sheet may be detected.

However, when the document sheet has a thin thickness, the known apparatus might erroneously detect a position of the white edge due to influences of light transmitted through the document sheet. Specifically, the document sheet has a portion where a large number of paper fibers overlap each other such that a small quantity of light may be transmitted therethrough and a portion where a small number of paper fibers overlap each other such that a large quantity of light may be transmitted therethrough. In the portion through which a large quantity of light may be transmitted, the known apparatus receives light re-transmitted through the document sheet after transmitted through the document sheet and reflected by the white document holder, as well as reflected light from the white document sheet. Thereby, the known apparatus acquires a scanned image of the portion as a whiter and brighter image than the background color of the document sheet. Therefore, when such a portion that a large quantity of light may be transmitted therethrough is near an end of the document sheet, it is difficult to determine whether a whiter and brighter scanned image than the background color is caused by reflected light from the white end face or by light re-transmitted through the document sheet. Thus, in this case, it is difficult to accurately detect the position of the white edge.

Aspects of the present disclosure are advantageous to provide one or more techniques, for an image scanning apparatus, which make it possible to accurately detect a white edge even when a portion where a large quantity of light may be transmitted therethrough is near an end of a document sheet.

According to aspects of the present disclosure, an image scanning apparatus is provided, which includes a document table configured to support a document sheet placed thereon, a document pressing member having a white document pressing surface, an image scanner including a light source and a plurality of light receivers arranged in line along a main scanning direction, the image scanner being configured to scan an image of the document sheet placed on the document table while moving along a sub scanning direction perpendicular to the main scanning direction and generate image data of the scanned image, the image data including a plurality of pixels each having a gradation value, the image scanner being further configured to generate a white gradation value by scanning the white document pressing surface of the document pressing member, and a controller. The controller is configured to perform an image data acquiring process to acquire single-page image data by controlling the image scanner to scan the document sheet placed on the document table and a particular range of the white document pressing surface, the particular range being wider than a size of the document sheet, a black edge detecting process to detect black edge positions by detecting, from the single-page image data, positions of black pixels each having a gradation value less than the white gradation value, each black edge position being a position of a specific one of a leading end and a trailing end of the document sheet in the sub scanning direction, a determining process to determine a sheet type of the document sheet based on the gradation values of the black pixels, the sheet type including a thin paper and a thick paper, and a white edge detecting process to detect white edge positions by detecting, from the single-page image data, positions of white pixels each having a gradation value equal to or more than the white gradation value, each white edge position being a position of another specific one of the leading end and the trailing end of the document sheet in the sub scanning direction. The white edge detecting process includes a thin-paper white edge detecting process to, when the sheet type is the thin paper, detect, as the white pixels, pixels each having a gradation value equal to or more than a first threshold by determining whether a gradation value of each pixel included in the single-page image data is equal to or more than the first threshold, the first threshold being determined based on the white gradation value, and a thick-paper white edge detecting process to, when the sheet type is the thick paper, detect, as the white pixels, pixels each having a gradation value equal to or more than a predetermined second threshold by determining whether the gradation value of each pixel included in the single-page image data is equal to or more than the second threshold.

According to aspects of the present disclosure, further provided is a method implementable on a processor coupled with an image scanning apparatus. The image scanning apparatus includes a document table configured to support a document sheet placed thereon, a document pressing member having a white document pressing surface, and an image scanner including a light source and a plurality of light receivers arranged in line along a main scanning direction, the image scanner being configured to scan an image of the document sheet placed on the document table while moving along a sub scanning direction perpendicular to the main scanning direction and generate image data of the scanned image, the image data including a plurality of pixels each having a gradation value, the image scanner being further configured to generate a white gradation value by scanning the white document pressing surface of the document pressing member. The method includes acquiring single-page image data by controlling the image scanner to scan the document sheet placed on the document table and a particular range of the white document pressing surface, the particular range being wider than a size of the document sheet, detecting black edge positions by detecting, from the single-page image data, positions of black pixels each having a gradation value less than the white gradation value, each black edge position being a position of a specific one of a leading end and a trailing end of the document sheet in the sub scanning direction, determining whether a sheet type of the document sheet is a thin paper or a thick paper, based on the gradation values of the black pixels, detecting white edge positions by detecting, from the single-page image data, positions of white pixels each having a gradation value equal to or more than the white gradation value, each white edge position being a position of another specific one of the leading end and the trailing end of the document sheet in the sub scanning direction, when determining that the sheet type is the thin paper, detecting, as the white pixels, pixels each having a gradation value equal to or more than a first threshold by determining whether a gradation value of each pixel included in the single-page image data is equal to or more than the first threshold, the first threshold being determined based on the white gradation value, and when determining that the sheet type is the thick paper, detecting, as the white pixels, pixels each having a gradation value equal to or more than a predetermined second threshold by determining whether the gradation value of each pixel included in the single-page image data is equal to or more than the second threshold.

According to aspects of the present disclosure, further provided is a non-transitory computer-readable medium storing computer-readable instructions that are executable by a processor coupled with an image scanning apparatus. The image scanning apparatus includes a document table configured to support a document sheet placed thereon, a document pressing member having a white document pressing surface, and an image scanner including a light source and a plurality of light receivers arranged in line along a main scanning direction, the image scanner being configured to scan an image of the document sheet placed on the document table while moving along a sub scanning direction perpendicular to the main scanning direction and generate image data of the scanned image, the image data including a plurality of pixels each having a gradation value, the image scanner being further configured to generate a white gradation value by scanning the white document pressing surface of the document pressing member. The instructions are configured to, when executed by the processor, cause the processor to perform an image data acquiring process to acquire single-page image data by controlling the image scanner to scan the document sheet placed on the document table and a particular range of the white document pressing surface, the particular range being wider than a size of the document sheet, a black edge detecting process to detect black edge positions by detecting, from the single-page image data, positions of black pixels each having a gradation value less than the white gradation value, each black edge position being a position of a specific one of a leading end and a trailing end of the document sheet in the sub scanning direction, a determining process to determine a sheet type of the document sheet based on the gradation values of the black pixels, the sheet type including a thin paper and a thick paper and a white edge detecting process to detect white edge positions by detecting, from the single-page image data, positions of white pixels each having a gradation value equal to or more than the white gradation value, each white edge position being a position of another specific one of the leading end and the trailing end of the document sheet in the sub scanning direction. The white edge detecting process includes a thin-paper white edge detecting process to, when the sheet type is the thin paper, detect, as the white pixels, pixels each having a gradation value equal to or more than a first threshold by determining whether a gradation value of each pixel included in the single-page image data is equal to or more than the first threshold, the first threshold being determined based on the white gradation value, and a thick-paper white edge detecting process to, when the sheet type is the thick paper, detect, as the white pixels, pixels each having a gradation value equal to or more than a predetermined second threshold by determining whether the gradation value of each pixel included in the single-page image data is equal to or more than the second threshold.

BRIEF DESCRIPTION OF THE ACCOMPANYING DRAWINGS

FIG. 1 schematically shows an internal configuration of an image scanning apparatus in an illustrative embodiment according to one or more aspects of the present disclosure.

Figure 13:
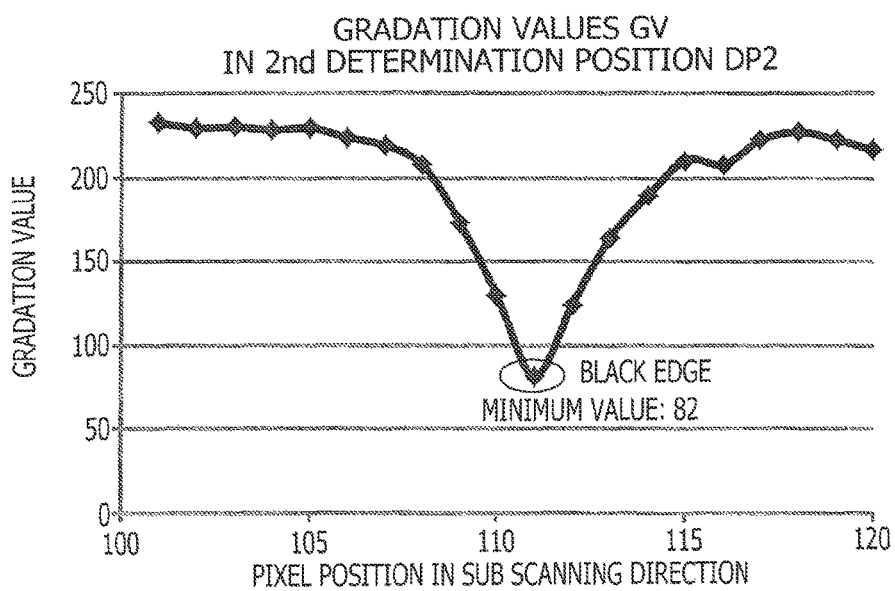

FIG. 13 exemplifies respective gradation values of the $101^{st}$ pixel to the $120^{th}$ pixel in a sub scanning direction, in a second determination position in a main scanning direction, in the illustrative embodiment according to one or more aspects of the present disclosure.

Figure 14:
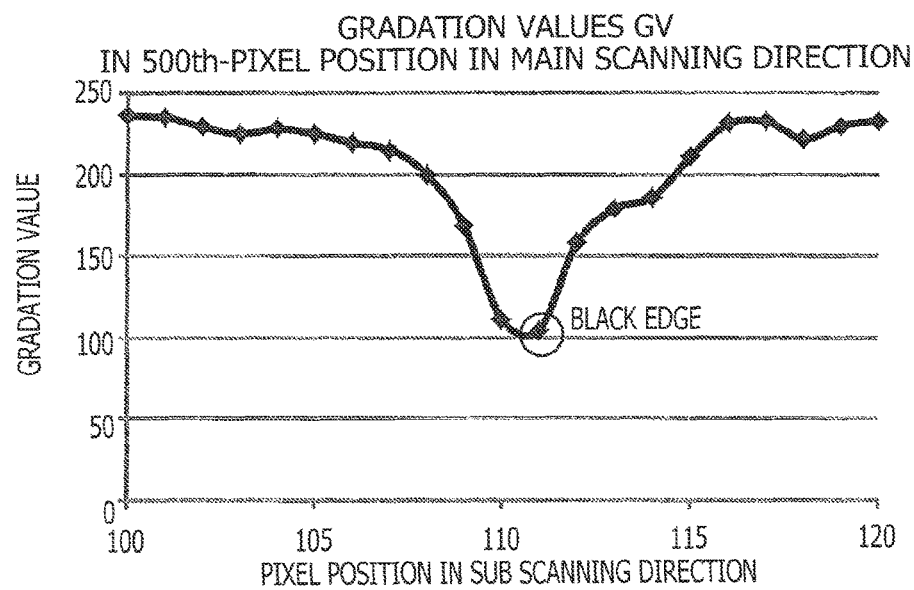

FIG. 14 exemplifies respective gradation values of the $100^{st}$ pixel to the $120^{th}$ pixel in the sub scanning direction, in the $500^{th}$-pixel position in the main scanning direction, in the illustrative embodiment according to one or more aspects of the present disclosure.

Figure 15:
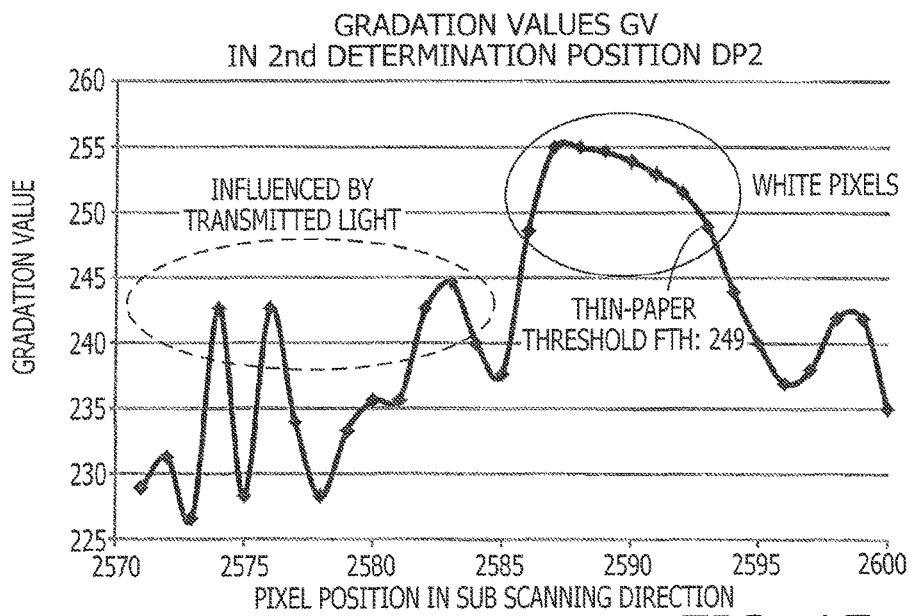

FIG. 15 exemplifies respective gradation values of the $2571^{st}$ pixel to the $2600^{th}$ pixel in the sub scanning direction, in the second determination position in a main scanning direction, in the illustrative embodiment according to one or more aspects of the present disclosure.

Figure 16:
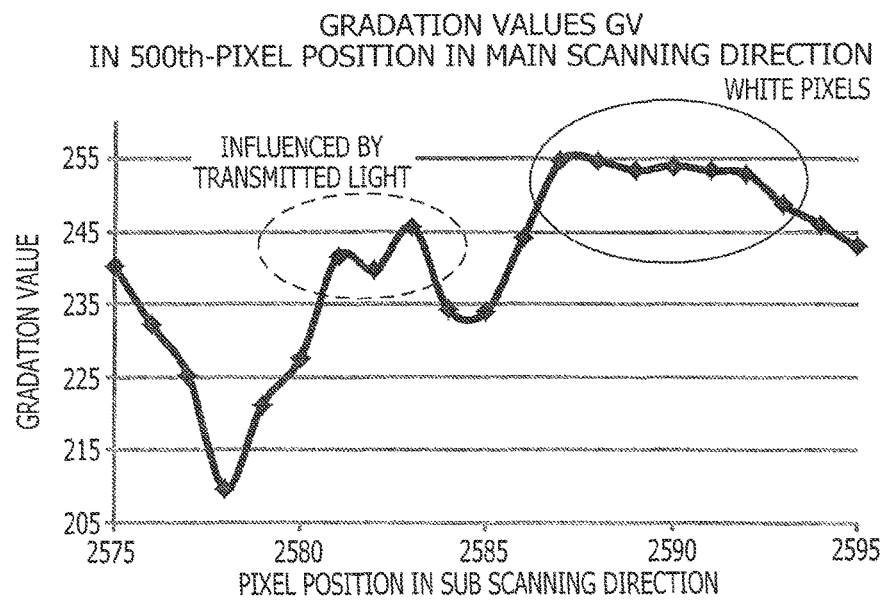

FIG. 16 exemplifies respective gradation values of the $2575^{th}$ pixel to the $2595^{th}$ pixel in the sub scanning direction, in the $500^{th}$-pixel position in the main scanning direction, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

<Configuration of Image Scanning Apparatus>

Figure 1:
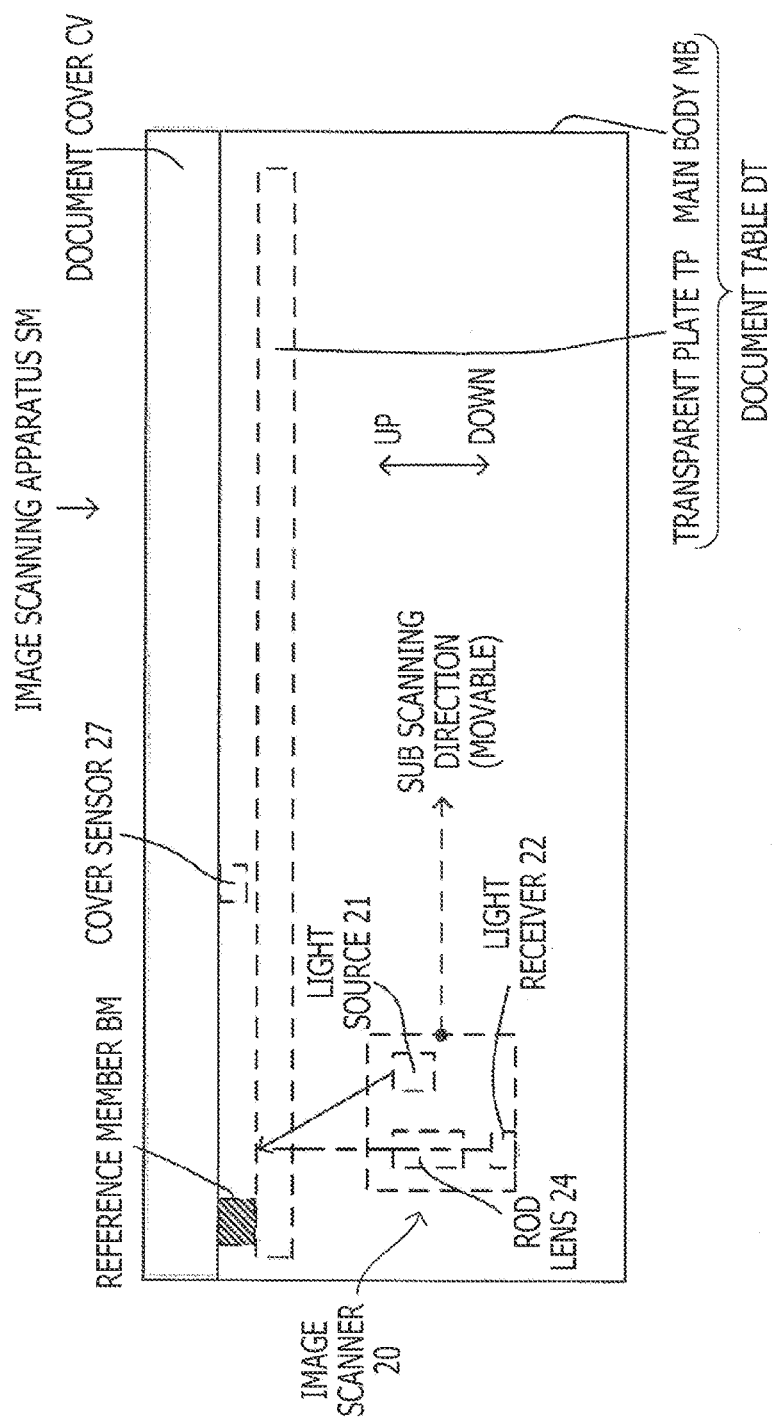
Figure 2:
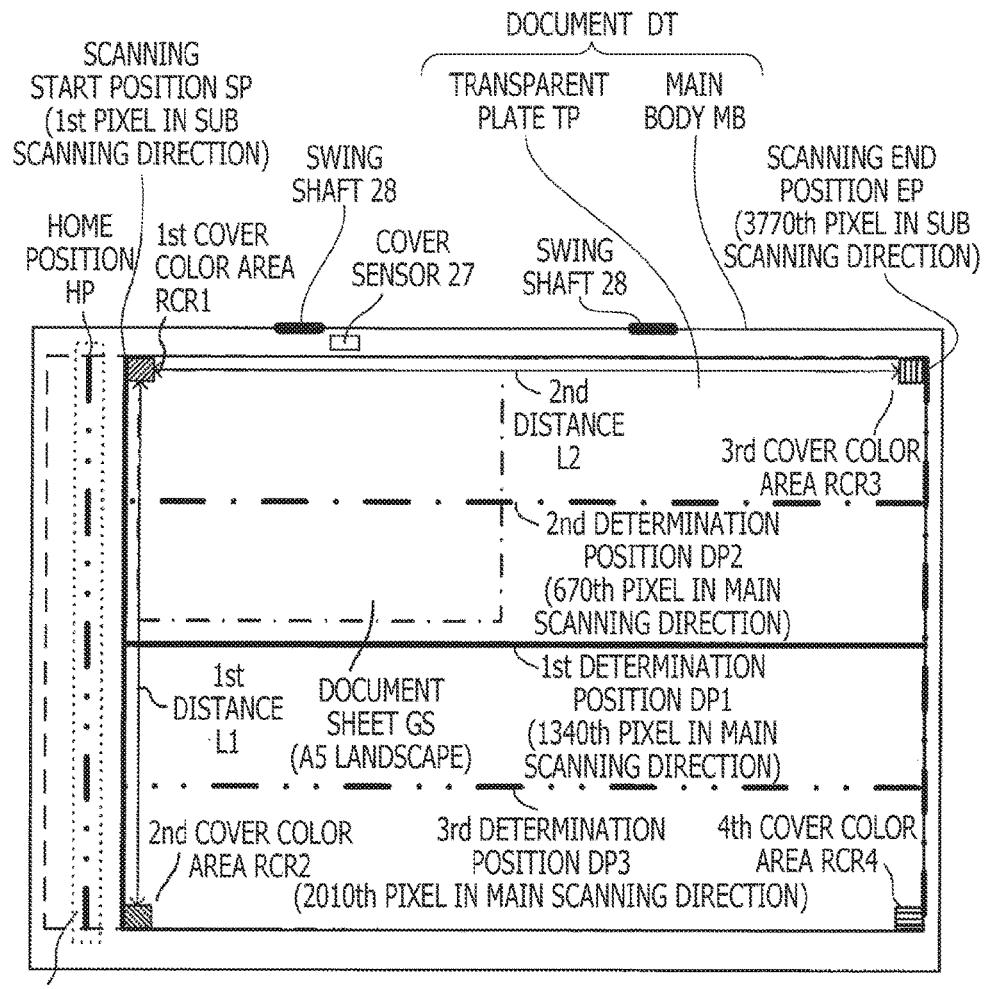
FIG. 2 is a plane view of a document table in the illustrative embodiment according to one or more aspects of the present disclosure.

FIG. 1 is a front view of an image scanning apparatus SM according to aspects of the present disclosure. FIG. 2 is a plane view of a document table DT. It is noted that in the following description, a right-hand side in FIG. 1 will be defined as a downstream side in a sub scanning direction. A lower side in FIG. 2 will be defined as a downstream side in a main scanning direction. A right-hand side in FIG. 2 will be defined as a downstream side in the sub scanning direction. The image scanning apparatus SM includes the document table DT and a document cover CV. The document table DT includes a main body MB and a transparent plate TP. The main body MB is configured to accommodate various members (e.g., the transparent plate TP and an image scanner 20). The transparent plate TP is disposed inside the main body MB and fixedly attached to the main body MB. The transparent plate TP is configured to support a document sheet placed thereon. The document cover CV is disposed above the main body MB. The document cover CV is openable and closable relative to the main body MB. The document cover CV includes swing shafts 28 disposed at a rear end portion (i.e., a far side portion in a direction perpendicular to a flat surface of FIG. 1, and an upper end portion in FIG. 2) of the main body MB. The document cover CV is configured to swing around the swing shafts 28 so as to be opened and closed from a front end (i.e., a near side portion in the direction perpendicular to the flat surface of FIG. 1, and a lower end portion in FIG. 2) of the main body MB.

The image scanning apparatus SM further includes the image scanner 20. The image scanner 20 is disposed below the transparent plate TP, inside the main body MB. The image scanner 20 is movable along the sub scanning direction (i.e., the left-to-right direction in FIG. 1) relative to the main body MB. The image scanner 20 is configured to scan an image of a document sheet placed on the transparent plate TP. The image scanner 20 includes a CIS ("CIS" is an abbreviated form of "contact image sensor"). More specifically, the image scanner 20 includes a light source 21, a rod lens 24, and a light receiver 22. The light source 21 includes a red LED ("LED" is an abbreviated form of "light-emitting diode"), a blue LED, and a green LED. The light source 21 is configured to emit light toward the transparent plate TP. The rod lens 24 is configured to receive reflected light of the light emitted by the light source 21.

The light receiver 22 includes 2680 photoelectric conversion elements 23 arranged along the main scanning direction. The light receiver 22 further incorporates therein a shift register (not shown) and an amplifier (not shown). An output from each photoelectric conversion element 23 corresponds to a quantity of light received by each of pixels arranged along the main scanning direction. A head pixel of the photoelectric conversion elements 23 is a pixel positioned upstream of any other pixels in the main scanning direction shown in FIG. 2. A final pixel of the photoelectric conversion elements 23 is a pixel positioned downstream of any other pixels in the main scanning direction shown in FIG. 2. In the illustrative embodiment, a single line is a pixel group including a plurality of pixels from the head pixel to the final pixel.

As shown in FIG. 2, an upper surface of the document table DT includes an upper surface of the main body MB and an upward-exposed surface of the transparent plate TP. The upward-exposed surface of the transparent plate TP is exposed toward the document cover CV. A cover sensor 27 and the swing shafts 28 are disposed at the main body MB. The transparent plate TP is formed in a rectangular shape having long sides along the sub scanning direction and short sides along the main scanning direction. The upward-exposed surface of the transparent plate TP is indicated by a solid line in FIG. 2. The most upstream position of the upward-exposed surface of the transparent plate TP in the sub scanning direction is a scanning start position SP. The most downstream position of the upward-exposed surface of the transparent plate TP in the sub scanning direction is a scanning end position EP. The number of pixels included in a range from the scanning start position SP to the scanning end position EP in the sub scanning direction is 3770. A document sheet may be set in any position on the transparent plate TP. The swing shafts 28 are configured to rotate when the document cover CV is opened and closed. The two swing shafts 28 are disposed at two places at an upstream end portion of the main body MB in the main scanning direction, respectively. The cover sensor 27 is disposed near the swing shafts 28. The cover sensor 27 is configured to output an ON signal when the document cover CV is open (hereinafter, which may be referred to as an "open state"), and output an OFF signal when the document cover CV is closed (hereinafter, which may be referred to as a "closed state").

An explanation will be provided of a first determination position DP1, a second determination position DP2, and a third determination position DP3, in each of which a below-mentioned black edge detecting process RA2 is performed. As indicated by a solid line in FIG. 2, the first determination position DP1 is a position for image scanning in the sub scanning direction, and a position of the $1340^{th}$ pixel from the head pixel in the main scanning direction. As indicated by an alternate long and short dash line in FIG. 2, the second determination position DP2 is a position for image scanning in the sub scanning direction, and a position of the $670^{th}$ pixel from the head pixel in the main scanning direction. As indicated by an alternate long and two short dashes line in FIG. 2, the third determination position DP3 is a position for image scanning in the sub scanning direction, and a position of the $2010^{th}$ pixel from the head pixel in the main scanning direction. A distance between the first determination position DP1 and the second determination position DP2 is longer than a width of a minimum one of readable document sizes. A distance between the first determination position DP1 and the third determination position DP3 is longer than the width of the minimum one of the readable document sizes.

An explanation will be provided of a first cover color area RCR1, a second cover color area RCR2, a third cover color area RCR3, and a fourth cover color area RCR4, in each of which a below-mentioned cover color deviation calculating process RA1 is performed. As indicated by oblique lines rising to the right in FIG. 2, the first cover color area RCR1 is a rectangular area that is positioned at the most upstream place of the upward-exposed surface of the transparent plate TP in both the main scanning direction and the sub scanning direction. Further, the first cover color area RCR1 includes 100 pixels in total within a range defined by 10 pixels in the main scanning direction and 10 pixels in the sub scanning direction. As indicated by oblique lines falling to the right in FIG. 2, the second cover color area RCR2 is a rectangular area that is positioned at the most downstream place of the upward-exposed surface of the transparent plate TP in the main scanning direction and positioned at the most upstream place of the upward-exposed surface of the transparent plate TP in the sub scanning direction. Further, the second cover color area RCR2 includes 100 pixels in total within a range defined by 10 pixels in the main scanning direction and 10 pixels in the sub scanning direction. As indicated by vertical lines in FIG. 2, the third cover color area RCR3 is a rectangular area that is positioned at the most upstream place of the upward-exposed surface of the transparent plate TP in the main scanning direction and positioned at the most downstream place of the upward-exposed surface of the transparent plate TP in the sub scanning direction. Further, the third cover color area RCR3 includes 100 pixels in total within a range defined by 10 pixels in the main scanning direction and 10 pixels in the sub scanning direction. As indicated by horizontal lines in FIG. 2, the fourth cover color area RCR4 is a rectangular area that is positioned at the most downstream place of the upward-exposed surface of the transparent plate TP in both the main scanning direction and the sub scanning direction. Further, the fourth cover color area RCR4 includes 100 pixels in total within a range defined by 10 pixels in the main scanning direction and 10 pixels in the sub scanning direction. The first cover color area RCR1 is a first distance L1 away from the second cover color area RCR2 in the main scanning direction. The first distance L1 is longer than a width of a maximum one of the readable document sizes. The first cover color area RCR1 is a second distance L2 away from the third cover color area RCR3 in the sub scanning direction. The second distance L2 is longer than the width of the maximum one of the readable document sizes.

The image scanning apparatus SM further includes a reference member BM fixedly attached onto the upper surface of the transparent plate TP. The reference member BM is disposed at an upstream end portion (i.e., a left end portion in FIG. 2) of the transparent plate TP in the sub scanning direction. The reference member BM is a white member extending along the main scanning direction. The reference member BM is used for acquisition of a below-mentioned correction data and for adjustment of the light source 21. Hereinafter, a center position of the reference member BM in the sub scanning direction will be referred to as a "home position HP." The image scanner 20 is configured to move along the sub scanning direction with the home position HP as a reference position.

<Electrical Configuration of Image Scanning Apparatus>

Figure 3:
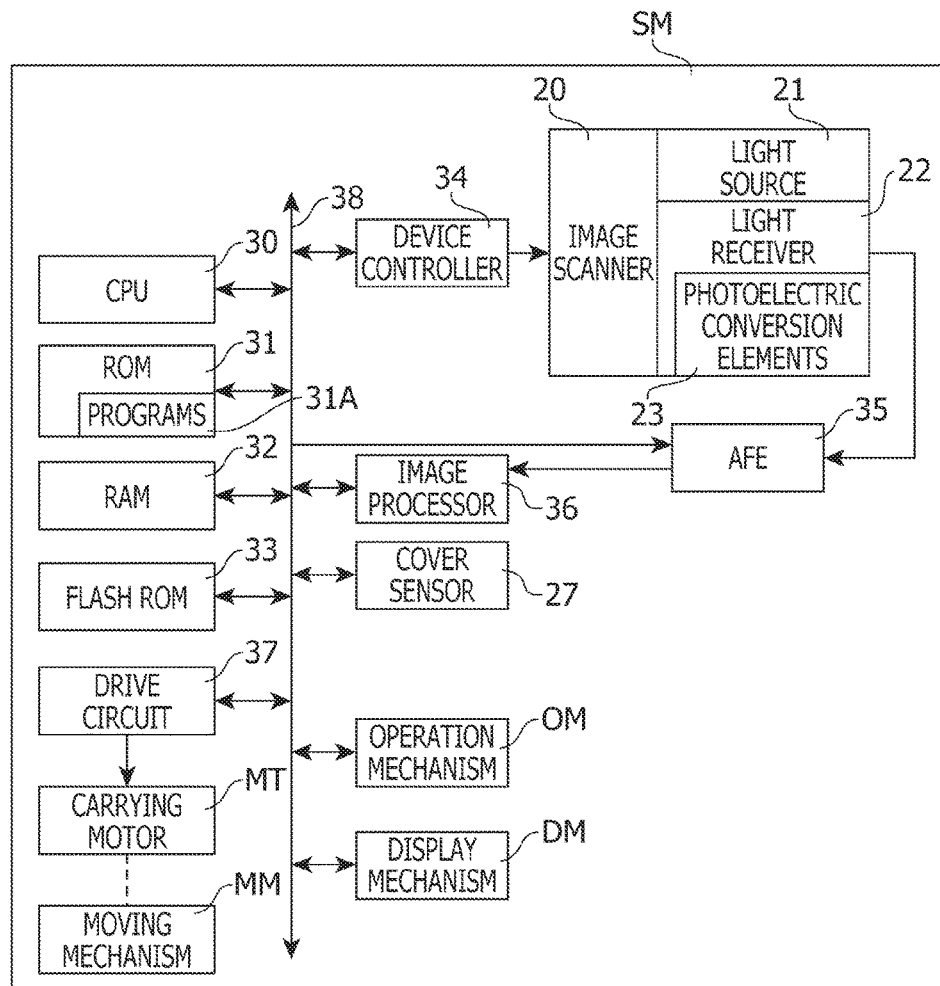
FIG. 3 is a block diagram schematically showing an electrical configuration of the image scanning apparatus in the illustrative embodiment according to one or more aspects of the present disclosure.

An electrical configuration of the image scanning apparatus SM will be described with reference to FIG. 3. As shown in FIG. 3, the image scanning apparatus SM includes a CPU 30, a ROM 31, a RAM 32, a flash ROM 33, a device controller 34, an analog front end (hereinafter referred to as an "AFE") 35, an image processor 36, and a drive circuit 37. The aforementioned elements are connected with an operation mechanism OM, a display mechanism DM, and a cover sensor 27, via a bus 38. The operation mechanism OM includes a plurality of keys such as a start button and a determination button. By operating the operation mechanism OM, the user may input various instructions into the image scanning apparatus SM. The display mechanism DM includes a display configured to display various kinds of information.

The ROM 31 stores therein programs 31A for executing processes (e.g., a below-mentioned main scanning process and subroutine processes) to control various operations by the image scanning apparatus SM. The CPU 30 is configured to control each of elements included in the image scanning apparatus SM in accordance with the programs 31A read out of the ROM 31. The flash ROM 33 is a non-volatile rewritable memory configured to store various types of data (e.g., data acquired in the main scanning process) generated in control processes by the CPU 30. The RAM 32 is configured to temporarily store calculation results generated in control processes by the CPU 30.

The device controller 34 is connected with the image scanner 20. The device controller 34 is configured to transmit, to the light source 21, a signal for turning on or off the light source 21 and a signal for controlling a value of an electrical current to be supplied to the light source 21, based on instructions from the CPU 30. Further, the device controller 34 is configured to transmit, to the light receiver 22, a serial-in signal SI for concurrently transferring electrical signals from the photoelectric conversion elements 23 to the shift register (not shown) and a clock signal CLK for causing the shift register to sequentially output electrical signals, based on instructions from the CPU 30. In response to receipt of those signals from the device controller 34, the image scanner 20 turns on the light source 21, and transmits to the AFE 35 an analog signal corresponding to a quantity of light received by the light receiver 22.

The AFE 35 is connected with the image scanner 20. The AFE 35 is configured to convert the analog signal received from the image scanner 20 into digital data, based on an instruction from the CPU 30. The AFE 35 has a predetermined input range and a predetermined resolution. For instance, the resolution may be 10 bits (i.e., gradations from 0 to 1023). In this case, the AFE 35 may convert the analog signal received from the image scanner 20 into 10-bit gradation data (ranging from 0 to 1023) as digital data. The digital data obtained via the conversion by the AFE 35 is transmitted to the image processor 36.

The image processor 36 includes an ASIC specific for image processing. The image processor 36 is configured to apply shading correction to the digital data. Nonetheless, the image processor 36 may be selectively set into one of a mode to enable the shading correction and a mode to disable the shading correction. When set into the mode to enable the shading correction, the image processor 36 applies the shading correction to the 10-bit digital data and generates 8-bit gradation values GV. The gradation values GV are stored into the RAM 32 via the bus 38. Meanwhile, when set into the mode to disable the shading correction, the image processor 36 stores the 10-bit digital data into the RAM 32. It is noted that the shading correction may include white correction and black correction. In the image processor 36, black correction data is set for the black correction, and white correction data is set for the white correction. In the illustrative embodiment, the gradation values GV are 8-bit gradation values ranging from 0 to 255.

The drive circuit 37 is connected with a carrying motor MT. The drive circuit 37 is configured to drive the carrying motor MT based on a driving instruction from the CPU 30. The drive circuit 37 rotates the carrying motor MT in accordance with a rotational quantity and a rotational direction specified by the driving instruction. In response to the carrying motor MT rotating by a particular rotational quantity, a moving mechanism MM rotates by a particular angle, thereby moving the image scanner 20 over a particular distance in the sub scanning direction.

<Operations by Image Scanning Apparatus>
(Main Scanning Process)

Figure 4:
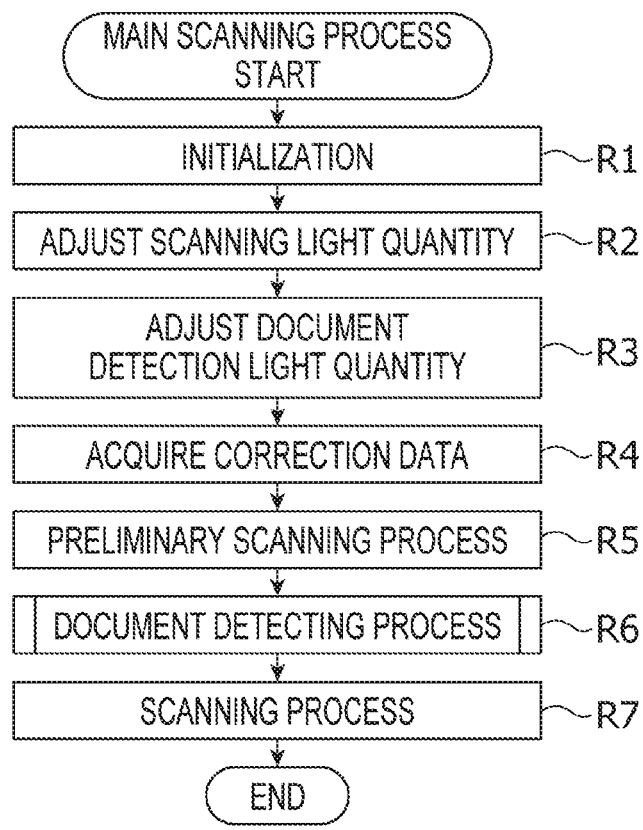
FIG. 4 is a flowchart showing a procedure of a main scanning process in the illustrative embodiment according to one or more aspects of the present disclosure.

Subsequently, operations by the image scanning apparatus SM will be described with reference to the accompanying drawings. The image scanning apparatus SM is configured to perform the main scanning process to scan a document sheet GS. Processes R1 to R7 in the main scanning process shown in FIG. 4 are performed by the CPU 30 executing one or more programs 31A stored in the ROM 31.

The main scanning process (see FIG. 4) is started in response to the user pressing a scanning start button of the operation mechanism OM after setting the document sheet GS on the document table DT and closing the document cover CV. Namely, in response to receiving an instruction issued when the scanning start button is pressed while the cover sensor 27 is outputting the OFF signal (i.e., in a state where the document cover CV is closed), the CPU 30 starts the main scanning process.

The CPU 30 initializes the device controller 34 and the image processor 36 (R1). Specifically, the CPU 30 acquires, from the flash ROM 33, settings for the clock signal CLK and the serial-in signal SI that are suitable for a scanning resolution of 300 DPI in the main scanning direction and a scanning resolution of 600 DPI in the sub scanning direction, and applies the acquired settings to the device controller 34. The CPU 30 sets the image processor 36 into the mode where the shading correction is disabled. The CPU 30 sets a first white count value WCT1 and a second white count value WCT2 to zero.

The CPU 30 adjusts a scanning light quantity ST1 (R2). The scanning light quantity ST1 is a quantity of light to be emitted in a below-mentioned scanning process R7. Specifically, in a state where each LED for a specific color included in the light source 21 is turned on with a previously-adjusted electrical current value, the CPU 30 controls the image scanner 20 to illuminate the reference member BM with light from the light source 21 and receive reflected light from the reference member BM. At this time, the CPU 30 adjusts a red lighting period, a green lighting period, and a blue lighting period in such a manner that a maximum value of 10-bit digital data obtained when the image scanner 20 receives the reflected light from the reference member BM becomes 1023.

The CPU 30 adjusts a document detection light quantity ST2 (R3). The document detection light quantity ST2 is a quantity of light to be emitted in a below-mentioned preliminary scanning process R5. Specifically, in a state where the green LED of the light source 21 is turned on with a previously-adjusted electrical current value, the CPU 30 controls the image scanner 20 to illuminate the reference member BM with green light from the light source 21 and receive reflected light from the reference member BM. At this time, the CPU 30 adjusts a green lighting period in such a manner that a maximum value of 10-bit digital data obtained when the image scanner 20 receives the reflected light from the reference member BM becomes 921. The value "921" is 10% smaller than the maximum value "1023" of the digital data.

The CPU 30 acquires correction data (R4). Specifically, the CPU 30 performs image scanning while turning off the light source 21, thereby acquiring 10-bit digital data of each pixel of a single line as black correction data. The CPU 30 scans the reference member BM while controlling the light source 21 to emit light with the scanning light quantity ST1, thereby obtaining 10-bit digital data of each pixel of a single line as white correction data.

The CPU performs the preliminary scanning process (R5). Specifically, the CPU 30 applies settings for the shading correction to the image processor 36. The CPU 30 sets the black correction data and the white correction data for the image processor 36. The CPU 30 transmits, to the drive circuit 37, an instruction to move the image scanner 20. While controlling the light source 21 to emit green light with the document detection light quantity ST2, the CPU 30 controls the image scanner 20 to scan a maximum scanning range from the scanning start position SP to the scanning end position EP with a scanning resolution of 300 DPI in the main scanning direction and a scanning resolution of 600 DPI in the sub scanning direction. The CPU 30 controls the image processor 36 to process the scanned digital data, thereby obtaining gradation values GV of a single page. Then, the CPU 30 stores the obtained gradation values GV into the RAM 32.

The CPU 30 detects document leading-end positions OHP and document trailing-end positions OTP from the gradation values GV of the single page that have been stored in the process R5 (R6). The document detecting process R6 will be described in detail later. A general outline of the process R6 will be provided here. The CPU 30 detects document leading-end positions OHP from the gradation values GV of the single page. The CPU 30 calculates a background color average BGAV by averaging gradation values GV of pixels positioned downstream of a document leading-end position OHP in the sub scanning direction. The CPU 30 calculates a black edge value deviation BED from gradation values GV of all pixels positioned in the document leading-end positions OHP. The CPU 30 determines whether the background color average deviation BGAV is equal to or more than a white determination value WDV. When determining that the background color average deviation BGAV is less than the white determination value WDV, the CPU 30 detects a document trailing-end position OTP in a background color edge detecting process RA9. When determining that the background color average deviation BGAV is equal to or more than the white determination value WDV, the CPU 30 determines whether the black edge value deviation BED is equal to or more than a sheet type threshold OTH. When determining that the black edge value deviation BED is equal to or more than the sheet type threshold OTH, the CPU 30 detects a document trailing-end position OTP in a thin-paper white edge detecting process RA12. When determining that the black edge value deviation BED is less than the sheet type threshold OTH, the CPU 30 detects a document trailing-end position OTP in a thick-paper white edge detecting process RA14.

The CPU 30 performs a scanning process (R7). Specifically, the CPU 30 acquires, from the flash ROM 33, settings for the clock signal CLK and the serial signal SI that are suitable for a user-set scanning resolution, and applies the acquired settings to the device controller 34. The CPU 30 transmits, to the drive circuit 37, an instruction to move the image scanner 20. The CPU 30 controls the image scanner 20 to scan a scanning range from the document leading-end positions OHP to the document trailing-end positions OTP with the user-set scanning resolution. The CPU 30 controls the image processor 36 to process the scanned digital data, and thereby obtaining gradation values GV as image data. Then, the CPU 30 stores the obtained image data (i.e., the obtained gradation values GV) into the RAM 32. It is noted that the scanning range from the document leading-end positions OHP to the document trailing-end positions OTP is an area surrounded by the document leading-end positions OHP, the document trailing-end positions OTP, a main-scanning most-upstream line, and a main-scanning most-downstream line. The main-scanning most-upstream line is a line from the most upstream pixel in the main scanning direction among pixels located in the document leading-end positions OHP to the most upstream pixel in the main scanning direction among pixels located in the document trailing-end positions OTP. The main-scanning most-downstream line is a line from the most downstream pixel in the main scanning direction among the pixels located in the document leading-end positions OHP to the most downstream pixel in the main scanning direction among the pixels located in the document trailing-end positions OTP.

(Document Detecting Process)

Figure 5A:
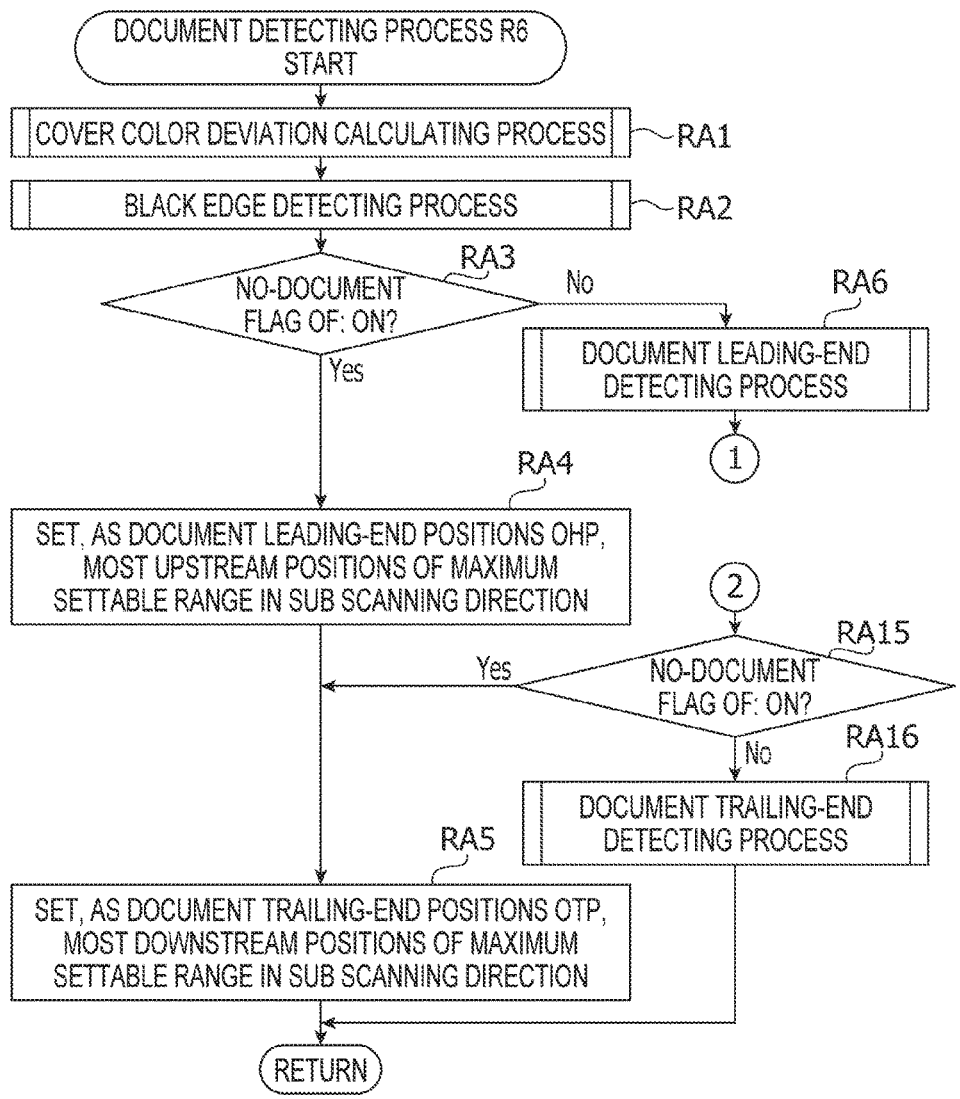
FIGS. 5A and 5B are flowcharts showing a procedure of a document detecting process in the illustrative embodiment according to one or more aspects of the present disclosure.
Figure 5B:
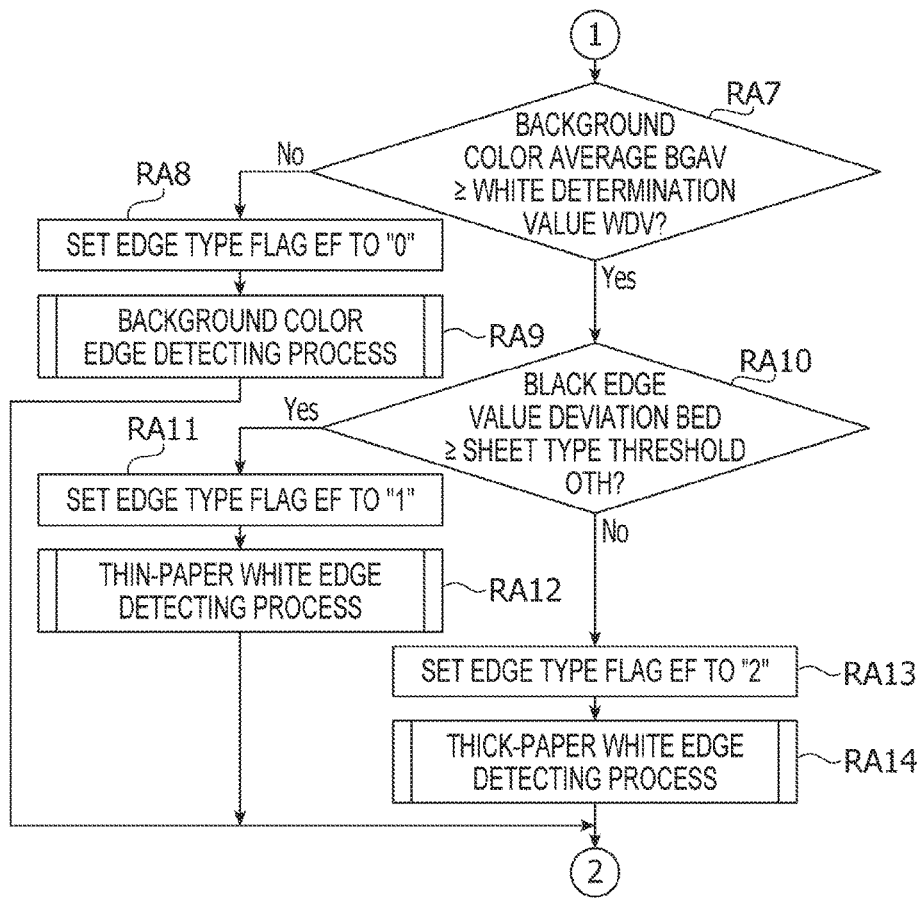

When the document detecting process R6 (see FIGS. 5A and 5B) is started, the CPU 30 calculates a cover color average CCAV and a cover color deviation CCD (RA1). The cover color deviation calculating process RA1 will be described in detail later. A general outline of the process RA1 will be provided here. The CPU 30 averages gradation values GV that are included in each of the first cover color area RCR1, the second cover color area RCR2, the third cover color area RCR3, and the fourth cover color area RCR4, among the gradation values GV of the single page that have been stored in the process R5. Thereby, the CPU 30 calculates a first cover color average CC1, a second cover color average CC2, a third cover color average CC3, and a fourth cover color average CC4. The CPU 30 selects three cover color averages that are within a particular range, from among the first cover color average CC1, the second cover color average CC2, the third cover color average CC3, and the fourth cover color average CC4. The CPU 30 calculates the cover color deviation CCD from gradation values GV of all pixels included in three cover color areas corresponding to the selected three cover color averages.

The CPU 30 detects a document leading-end position OHP in the first determination position DP1, the second determination position DP2, and the third determination position DP3, from the gradation values GV of the single page that have been stored in the process R5 (RA2). The black edge detecting process RA2 will be described in detail later. A general outline of the process RA2 will be provided here. In the first determination position DP1, the second determination position DP2, or the third determination position DP3 in the main scanning direction, the CPU 30 detects, as a document leading-end position OHP, a position of a particular pixel having a gradation value GV of which a difference from the cover color average CCAV is equal to or more than a first black threshold BTH1, in the downstream direction along the sub scanning direction from the scanning start position SP. The CPU 30 calculates a background color average BGAV by averaging gradation values GV of 100 pixels successively arranged in the downstream direction along the sub scanning direction from a specific pixel, which is located 100 pixels away from the document leading-end position OHP in the downstream direction along the sub scanning direction. When the document leading-end position OHP is not detected in any of the first determination position DP1, the second determination position DP2, and the third determination position DP3, the CPU 30 sets a no-document flag OF to "ON." It is noted that the above particular pixel, which has a gradation value GV of which the difference from the cover color average CCAV is equal to or more than the first black threshold BTH1, is a black pixel representing a black edge.

The CPU 30 determines whether the no-document flag OF is "ON" (RA3). When determining that the no-document flag OF is not "ON" (RA3: No), the CPU 30 goes to a document leading-end detecting process RA6. Meanwhile, when determining that the no-document flag OF is "ON" (RA3: Yes), the CPU 30 goes to a process RA4.

The CPU 30 sets, as document leading-end positions OHP, the most upstream positions of a maximum settable range in the sub scanning direction (RA4). Specifically, with respect to all pixel positions from a head-pixel position to a final-pixel position in the main scanning direction, the CPU

30 sets, as document leading-end positions OHP, positions of all pixels located in the scanning start position SP in the sub scanning direction.

The CPU 30 sets, as document trailing-end positions OTP, the most downstream positions of the maximum settable range in the sub scanning direction (RA5). Specifically, with respect to all the pixel positions from the head-pixel position to the final-pixel position in the main scanning direction, the CPU 30 sets, as document trailing-end positions OTP, positions of all pixels located in the scanning end position EP in the sub scanning direction. After completion of the process RA5, the CPU 30 terminates the document detecting process R6.

When determining that the no-document flag OF is not "ON" (RA3: No), the CPU 30 detects document leading-end positions OHP (RA6). The document leading-end detecting process RA6 will be described in detail later. A general outline of the process RA6 will be provided here. The CPU 30 sets, as a group of upstream target pixels, 21 pixels including a first reference pixel, 10 upstream pixels, and 10 downstream pixels. It is noted that the first reference pixel is adjacent to an upstream end, in the main scanning direction, of a pixel located in a most upstream document leading-end position OHP in the main scanning direction. The 10 upstream pixels are successively-arranged pixels adjacent to an upstream end of the first reference pixel in the sub scanning direction. The 10 downstream pixels are successively-arranged pixels adjacent to a downstream end of the first reference pixel in the sub scanning direction. The CPU 30 detects, as a document leading-end position OHP, a position of such a particular pixel that a gradation value GV thereof is a smallest gradation value GV among the set group of the upstream target pixels and that a difference between the smallest gradation value GV and the cover color average CCAV is equal to or more than the first black threshold BTH1. When detecting a new document leading-end position OHP, the CPU 30 again sets a group of upstream target pixels, and detects a document leading-end position OHP. Likewise, the CPU 30 sets, as a group of downstream target pixels, 21 pixels including a second reference pixel, 10 upstream pixels, and 10 downstream pixels. It is noted that the second reference pixel is adjacent to a downstream end, in the main scanning direction, of a pixel located in a most downstream document leading-end position OHP in the main scanning direction. The 10 upstream pixels are successively-arranged pixels adjacent to an upstream end of the second reference pixel in the sub scanning direction. The 10 downstream pixels are successively-arranged pixels adjacent to a downstream end of the second reference pixel in the sub scanning direction. The CPU 30 detects, as a document leading-end position OHP, a position of such a particular pixel that a gradation value GV thereof is a smallest gradation value GV among the set group of the downstream target pixels and that a difference between the smallest gradation value GV and the cover color average CCAV is equal to or more than the first black threshold BTH1. When detecting a new document leading-end position OHP, the CPU 30 again sets a group of downstream target pixels, and detects a document leading-end position OHP. The CPU 30 calculates the black edge value deviation BED from gradation values GV of respective pixels located in all the detected document leading-end positions OHP. It is noted that each particular pixel, which has a gradation value GV of which the difference from the cover color average CCAV is equal to or more than the first black threshold BTH1, is a black pixel representing a black edge.

The CPU 30 determines whether the background color average BGAV is equal to or more than the white determination value WDV (RA7). When determining that the background color average BGAV is equal to or more than the white determination value WDV (RA7: Yes), the CPU 30 goes to a process RA10. Meanwhile, when determining that the background color average BGAV is less than the white determination value WDV (RA7: No), the CPU 30 goes to a process RA8. In the process RA8, the CPU 30 sets an edge type flag EF to zero (RA8). In the illustrative embodiment, the white determination value WDV is 200. When detecting a gradation value GV equal to or more than 200 representing a background color of the document sheet, the CPU 30 may identify the detected gradation value GV as a "white edge" having a gradation value GV more than a gradation value GV of a white color.

In an end determination position EDP in the main scanning direction, the CPU 30 detects a document trailing-end position OTP, based on a background color threshold BGTH (RA9). The background color edge detecting process RA9 will be described in detail later. A general outline of the process RA9 will be provided here. The CPU 30 averages the cover color average CCAV and the background color average BGAV, thereby calculating the background color threshold BGTH. In the end determination position EDP, the CPU 30 detects, as a document trailing-end position OTP, a position of a pixel having a gradation value GV less than the background color threshold BGTH, in the upstream direction along the sub scanning direction from a pixel located in the scanning end position EP in the sub scanning direction. When the CPU 30 could not detect a document trailing-end position OTP in the end determination position EDP, the CPU 30 sets the no-document flag OF to "ON."

When determining that the background color average BGAV is equal to or more than the white determination value WDV (RA7: Yes), the CPU 30 determines whether the black edge value deviation BED is equal to or more than the sheet type threshold OTH (RA10). When determining that the black edge value deviation BED is less than the sheet type threshold OTH (RA10: No), the CPU 30 determines that the sheet type of the document sheet is a thick paper, and goes to a process RA13. In the process RA13, the CPU 30 sets the edge type flag EF to 2 (RA13). When determining that the black edge value deviation BED is equal to or more than the sheet type threshold OTH (RA10: Yes), the CPU 30 determines that the sheet type of the document sheet is a thin paper, and goes to a process RA11. In the process RA11, the CPU 30 sets the edge type flag EF to 1 (RA11). In the illustrative embodiment, the sheet type threshold OTH is 5, which is about 2% of the count (i.e., 256) of 8-bit gradations. In general, when the document sheet is a thin paper, a gradation value GV of each pixel (i.e., a gradation value GV of a shadow of the document sheet) at the leading end of the document sheet unstably fluctuates. When the document sheet is a thick paper, the gradation value GV of each pixel at the leading end of the document sheet is so stable as to fluctuate by about 1% of the number of 8-bit gradations.

In the end determination position EDP in the main scanning direction, the CPU 30 detects a document trailing-end position OTP, based on a first white threshold WTH1 and a second white threshold WTH2 (RA12). The thin-paper white edge detecting process RA12 will be described in detail later. A general outline of the process RA12 will be provided here. The CPU 30 calculates the first white threshold WTH1 by adding the cover color deviation CCD to the cover color average CCAV. The CPU 30 calculates the second white threshold WTH2 by adding a background color deviation BGD to the background color average BGAV. In the end determination position EDP in the main scanning direction, the CPU 30 detects a position of the most upstream pixel in the sub scanning direction among seven successive pixels each having a gradation value GV equal to or more than the first white threshold WTH1, in the upstream direction along the sub scanning direction from the pixel located in the scanning end position EP in the sub scanning direction. The CPU 30 stores, as a thin-paper threshold FTH into the RAM 32, the gradation value GV of the detected most upstream pixel in the sub scanning direction. The CPU 30 detects, as a document trailing-end position OTP, a position of a pixel having a gradation value GV less than the second white threshold WTH2, in the upstream direction along the sub scanning direction from the detected most upstream pixel in the sub scanning direction among seven successive pixels each having a gradation value GV equal to or more than the first white threshold WTH1. When the CPU 30 could not detect a document trailing-end position OTP in the end determination position EDP, the CPU 30 sets the no-document flag OF to "ON." It is noted here that white pixels representing the white edge are pixels from the detected most upstream pixel in the sub scanning direction among seven successive pixels having gradation values GV equal to or more than the first white threshold WTH1 to the detected pixel having a gradation value GV less than the second white threshold WTH2.

After completion of the process RA13, the CPU 30 detects a document trailing-end position OTP in the end determination position EDP, based on the maximum value of gradation values GV and a third white threshold WTH3 (RA14). The thick-paper white edge detecting process RA14 will be described in detail later. A general outline of the process RA14 will be provided here. In the end determination position EDP in the main scanning direction, the CPU 30 detects a position of the most upstream pixel in the sub scanning direction among three successive pixels each having the maximum value of gradation values GV, in the upstream direction along the sub scanning direction from the pixel located in the scanning end position EP in the sub scanning direction. The CPU 30 detects, as a document trailing-end position OTP, a position of a pixel having a gradation value GV less than the third white threshold WTH3, in the upstream direction along the sub scanning direction from the detected most upstream pixel in the sub scanning direction among three successive pixels each having the maximum gradation value GV. When the CPU 30 could not detect a document trailing-end position OTP in the end determination position EDP, the CPU 30 sets the no-document flag OF to "ON." In the illustrative embodiment, the third white threshold WTH3 is 250, which is about 98% of the count (i.e., 256) of 8-bit gradations. This is because when the document sheet has a background color of which a gradation value GV is 200, a gradation value GV of each pixel representing the white edge may change from 255 to 253. It is noted here that white pixels representing the white edge are pixels from the detected most upstream pixel in the sub scanning direction among three successive pixels each having the maximum value of gradation values GV to the detected pixel having a gradation value GV less than the third white threshold WTH3.

The CPU 30 determines whether the no-document flag OF is "ON" (RA15). When determining that the no-document flag OF is "ON" (RA15: Yes), the CPU 30 goes to the process RA5. Meanwhile, when determining that the no-document flag OF is not "ON" (RA15: No), the CPU 30 goes to a document trailing-end detecting process RA16.

The CPU 30 detects a document trailing-end position OTP (RA16). The document trailing-end detecting process RA16 will be described in detail later. A general outline of the process RA16 will be provided here. When the edge type flag EF is 0, the CPU 30 sets the background color threshold BGTH as a trailing-end threshold TTH. When the edge type flag EF if 1, the CPU 30 sets the thin-paper threshold FTH as a trailing-end threshold TTH. When the edge type flag EF is 2, the CPU 30 sets the third white threshold WTH3 as a trailing-end threshold TTH. The CPU 30 sets, as a group of upstream target pixels, 21 pixels including a third reference pixel, 10 upstream pixels, and 10 downstream pixels. It is noted that the third reference pixel is adjacent to an upstream end, in the main scanning direction, of a pixel located in a most upstream document trailing-end position OTP in the main scanning direction. The 10 upstream pixels are successively-arranged pixels adjacent to an upstream end of the third reference pixel in the sub scanning direction. The 10 downstream pixels are successively-arranged pixels adjacent to a downstream end of the third reference pixel in the sub scanning direction. The CPU 30 detects, as a document trailing-end position OTP, a position of a pixel that is positioned downstream, in the sub scanning direction, of the most upstream pixel in the sub scanning direction among the set group of the upstream target pixels and has a gradation value GV equal to or more than the trailing-end threshold TTH. When detecting a new document trailing-end position OTP, the CPU 30 again sets a group of upstream target pixels and detects a document trailing-end position OTP. Likewise, the CPU 30 sets, as a group of downstream target pixels, 21 pixels including a fourth reference pixel, 10 upstream pixels, and 10 downstream pixels. It is noted that the fourth reference pixel is adjacent to a downstream end, in the main scanning direction, of a pixel located in a most downstream document trailing-end position OTP in the main scanning direction. The 10 upstream pixels are successively-arranged pixels adjacent to an upstream end of the fourth reference pixel in the sub scanning direction. The 10 downstream pixels are successively-arranged pixels adjacent to a downstream end of the fourth reference pixel in the sub scanning direction. The CPU 30 detects, as a document trailing-end position OTP, a position of a pixel that is positioned downstream, in the sub scanning direction, of the most upstream pixel in the sub scanning direction among the set group of the downstream target pixels and has a gradation value GV equal to or more than the trailing-end threshold TTH. When detecting a new document trailing-end position OTP, the CPU 30 again sets a group of downstream target pixels and detects a document trailing-end position OTP. After completion of the process RA16, the CPU 30 terminates the document detecting process R6 and returns to the main scanning process (see FIG. 4).

(Cover Color Deviation Calculating Process)

Figure 6A:
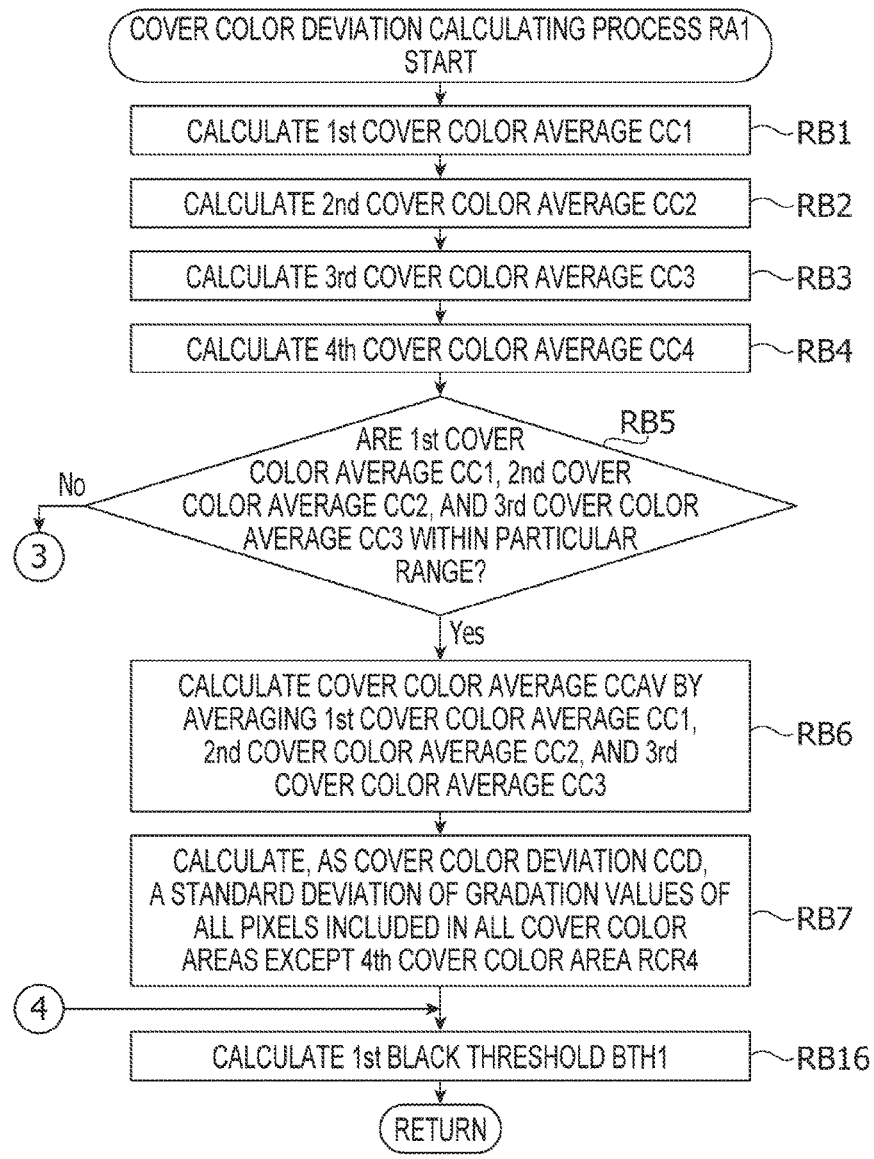
FIGS. 6A and 6B are flowcharts showing a procedure of a cover color deviation calculating process in the illustrative embodiment according to one or more aspects of the present disclosure.
Figure 6B:
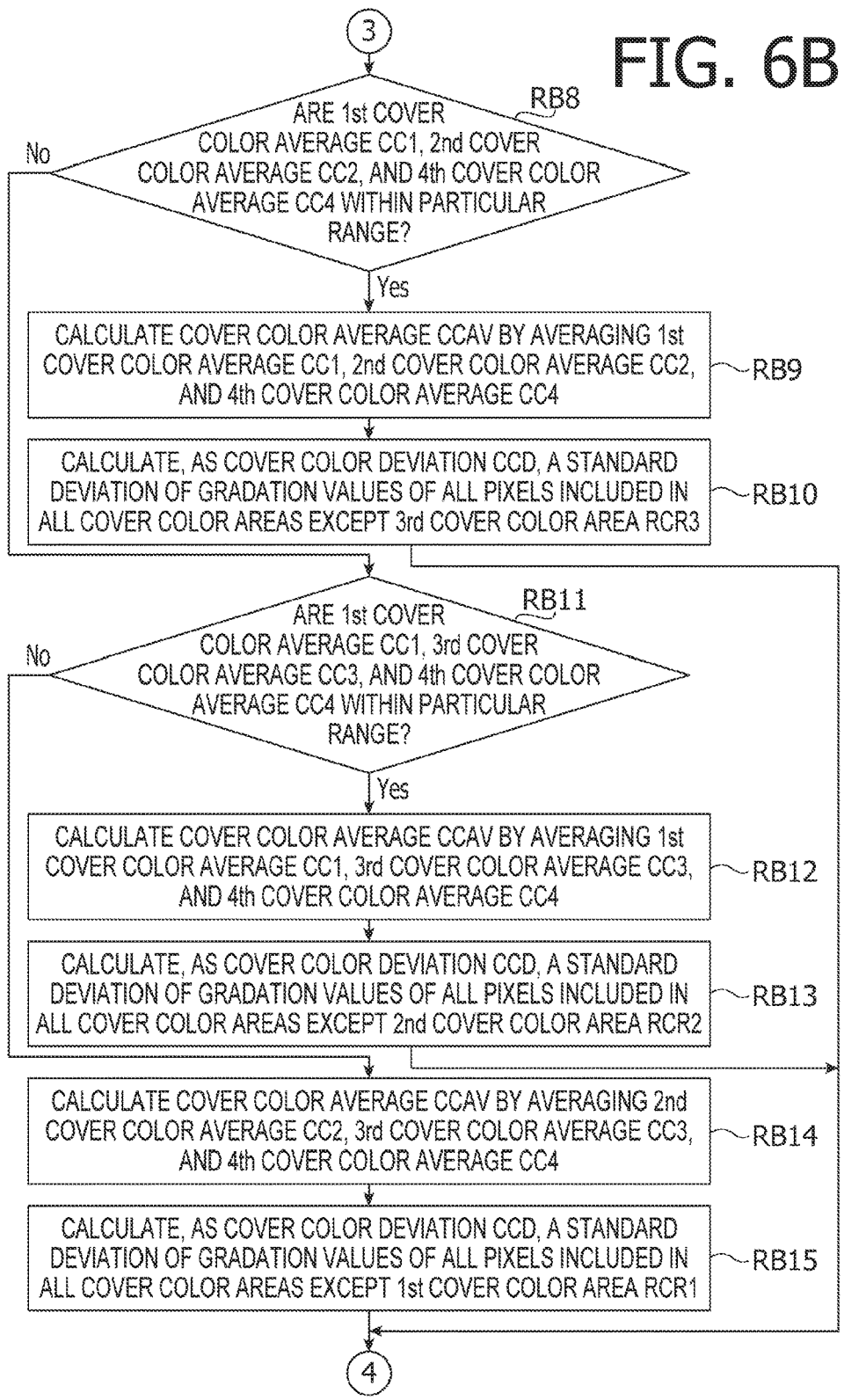

When the cover color deviation calculating process RA1 (see FIGS. 6A and 6B) is started, the CPU 30 calculates the first cover color average CC1 (RBI). Specifically, the CPU 30 calculates the first cover color average CC1 by averaging gradation values GV of all the pixels positioned within the first cover color area RCR1 among the gradation values GV of the single page that have been obtained in the process R5.

The CPU 30 calculates the second cover color average CC2 (RB2). Specifically, the CPU 30 calculates the second cover color average CC2 by averaging gradation values GV of all the pixels positioned within the second cover color area RCR2 among the gradation values GV of the single page that have been obtained in the process R5.

The CPU 30 calculates the third cover color average CC3 (RB3). Specifically, the CPU 30 calculates the third cover color average CC3 by averaging gradation values GV of all the pixels positioned within the third cover color area RCR3 among the gradation values GV of the single page that have been obtained in the process R5.

The CPU 30 calculates the fourth cover color average CC4 (RB4). Specifically, the CPU 30 calculates the fourth cover color average CC4 by averaging gradation values GV of all the pixels positioned within the fourth cover color area RCR4 among the gradation values GV of the single page that have been obtained in the process R5.

The CPU 30 determines whether the first cover color average CC1, the second cover color average CC2, and the third cover color average CC3 are within a particular range (RB5). When determining that the first cover color average CC1, the second cover color average CC2, and the third cover color average CC3 are not within the particular range (RB5: No), the CPU 30 goes to a process RB8. Meanwhile, when determining that the first cover color average CC1, the second cover color average CC2, and the third cover color average CC3 are within the particular range (RB5: Yes), the CPU 30 goes to a process RB6. In the illustrative embodiment, for instance, the particular range may be a value width of 12. A white color of the document cover CV may vary by a gradation value of 10 due to color degradation. Therefore, the particular range is a value width wider than 10.

The CPU 30 calculates the cover color average CCAV by averaging the first cover color average CC1, the second cover color average CC2, and the third cover color average CC3 (RB6).

The CPU 30 calculates the cover color deviation CCD (RB7). Specifically, the CPU 30 calculates, as the cover color deviation CCD, a standard deviation of gradation values GV of all pixels included in all areas of the first cover color area RCR1, the second cover color area RCR2, and the third cover color area RCR3. After completion of the process RB7, the CPU 30 goes to a process RB16.

When determining that the first cover color average CC1, the second cover color average CC2, and the third cover color average CC3 are not within the particular range (RB5: No), the CPU 30 determines whether the first cover color average CC1, the second cover color average CC2, and the fourth cover color average CC4 are within the particular range (RB8). When determining that the first cover color average CC1, the second cover color average CC2, and the fourth cover color average CC4 are not within the particular range (RB8: No), the CPU 30 goes to a process RB11. Meanwhile, when determining that the first cover color average CC1, the second cover color average CC2, and the fourth cover color average CC4 are within the particular range (RB8: Yes), the CPU 30 goes to a process RB9.

The CPU 30 calculates the cover color average CCAV by averaging the first cover color average CC1, the second cover color average CC2, and the fourth cover color average CC4 (RB9).

The CPU 30 calculates the cover color deviation CCD (RB10). Specifically, the CPU 30 calculates, as the cover color deviation CCD, a standard deviation of gradation values GV of all pixels included in all areas of the first cover color area RCR1, the second cover color area RCR2, and the fourth cover color area RCR4. After completion of the process RB10, the CPU 30 goes to the process RB16.

When determining that the first cover color average CC1, the second cover color average CC2, and the fourth cover color average CC4 are not within the particular range (RB8: No), the CPU 30 determines whether the first cover color average CC1, the third cover color average CC3, and the fourth cover color average CC4 are within the particular range (RB11). When determining that the first cover color average CC1, the third cover color average CC3, and the fourth cover color average CC4 are not within the particular range (RB11: No), the CPU 30 goes to a process RB14. Meanwhile, when determining that the first cover color average CC1, the third cover color average CC3, and the fourth cover color average CC4 are within the particular range (RB11: Yes), the CPU 30 goes to a process RB12.

The CPU 30 calculates the cover color average CCAV by averaging the first cover color average CC1, the third cover color average CC3, and the fourth cover color average CC4 (RB12).

The CPU 30 calculates the cover color deviation CCD (RB13). Specifically, the CPU 30 calculates, as the cover color deviation CCD, a standard deviation of gradation values GV of all pixels included in all areas of the first cover color area RCR1, the third cover color area RCR3, and the fourth cover color area RCR4. After completion of the process RB13, the CPU 30 goes to the process RB16.

When determining that the first cover color average CC1, the third cover color average CC3, and the fourth cover color average CC4 are not within the particular range (RB11: No), the CPU 30 calculates the cover color average CCAV by averaging the second cover color average CC2, the third cover color average CC3, and the fourth cover color average CC4 (RB14).

The CPU 30 calculates the cover color deviation CCD (RB 15). Specifically, the CPU 30 calculates, as the cover color deviation CCD, a standard deviation of gradation values GV of all pixels included in all areas of the second cover color area RCR2, the third cover color area RCR3, and the fourth cover color area RCR4.

The CPU 30 calculates the first black threshold BTH1 (RB16). Specifically, the CPU 30 calculates the first black threshold BTH1 by subtracting the cover color deviation CCD multiplied by two from the cover color average CCAV. After completion of the process RB16, the CPU 30 terminates the cover color deviation calculating process RA1, and returns to the document detecting process R6 (see FIGS. 5A and 5B).

(Black Edge Detecting Process)

Figure 7A:
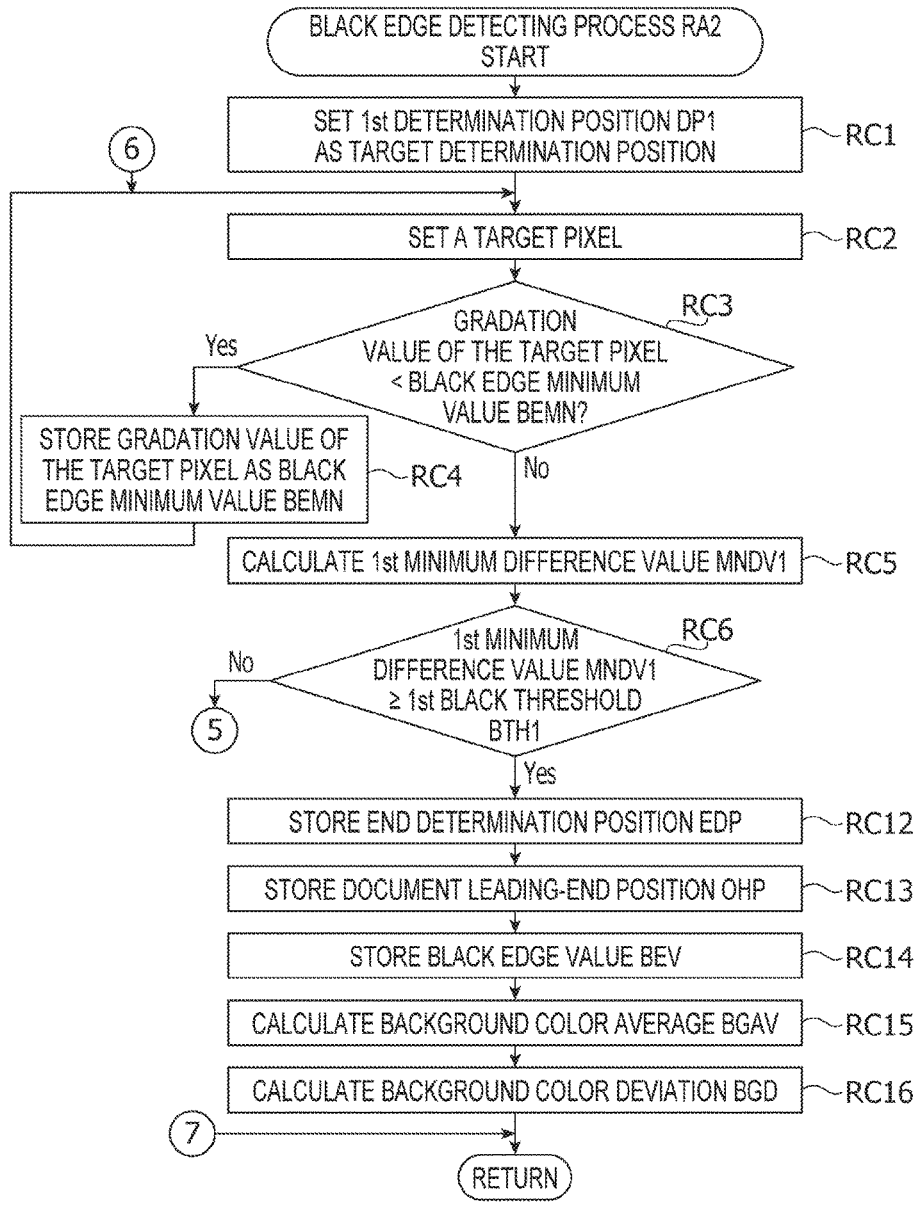
FIGS. 7A and 7B are flowcharts showing a procedure of a black edge detecting process in the illustrative embodiment according to one or more aspects of the present disclosure.
Figure 7B:
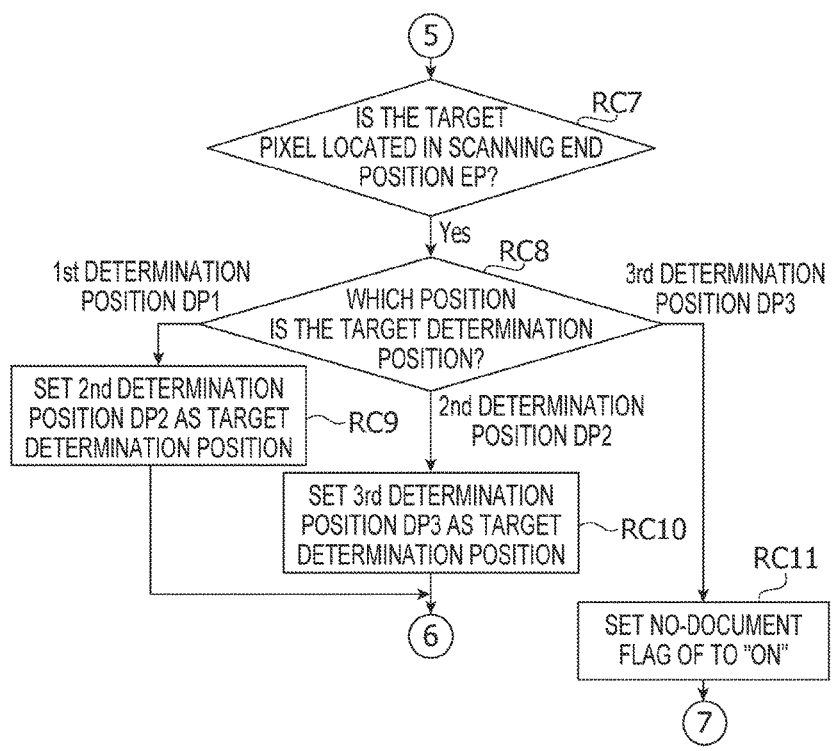

When the black edge detecting process RA2 (see FIGS. 7A and 7B) is started, the CPU 30 sets the first determination position DP1 as a target determination position, and sets a pixel number SPN to zero (RC1).

The CPU 30 sets a target pixel (RC2). Specifically, the CPU 30 increments the pixel number SPN by one. Further, the CPU 30 sets, as a new target pixel, a pixel adjacent to a downstream end of a current target pixel in the sub scanning direction, in the target determination position in the main scanning direction. When there is no target pixel currently set, the CPU 30 increments the pixel number SPN by one, and sets, as a target pixel, a pixel located in the target determination position in the main scanning direction and in the scanning start position in the sub scanning direction. Furthermore, in this case, the CPU 30 sets a black edge minimum value BEMN to 255.

The CPU 30 determines whether a gradation value GV of the target pixel is less than the black edge minimum value BEMN (RC3). When determining that the gradation value GV of the target pixel is equal to or more than the black edge minimum value BEMN (RC3: No), the CPU 30 goes to a process RC5. Meanwhile, when determining that the gradation value GV of the target pixel is less than the black edge minimum value BEMN (RC3: Yes), the CPU 30 goes to a process RC4.

The CPU 30 stores the gradation value GV of the target pixel as a black edge minimum value BEMN (RC4). Specifically, the CPU 30 stores, into the RAM 32, the gradation value GV of the target pixel as a black edge minimum value BEMN in association with the pixel number SPN. After completion of the process RC4, the CPU 30 goes to the process RC2.

When determining that the gradation value GV of the target pixel is equal to or more than the black edge minimum value BEMN (RC3: No), the CPU 30 calculates a first minimum difference value MNDV1 (RC5). Specifically, the CPU 30 calculates the first minimum difference value MNDV1 by subtracting the black edge minimum value BEMN from the cover color average CCAV.

The CPU 30 determines whether the first minimum difference value MNDV1 is equal to or more than the first black threshold BTH1 (RC6). When determining that the first minimum difference value MNDV1 is equal to or more than the first black threshold BTH1 (RC6: Yes), the CPU 30 deletes settings for the target pixel and goes to a process RC12. Meanwhile, when determining that the first minimum difference value MNDV1 is less than the first black threshold BTH1 (RC6: No), the CPU 30 goes to a process RC7.

The CPU 30 determines whether the target pixel is a pixel located in the scanning end position EP (RC7). When determining that the target pixel is not a pixel located in the scanning end position EP (RC7: No), the CPU 30 goes to the process RC2. Meanwhile, when determining that the target pixel is a pixel located in the scanning end position EP (RC7: Yes), the CPU 30 deletes settings for the target pixel and goes to a process RC8.

The CPU 30 determines which position is the target determination position (RC8). When determining that the first determination position DP1 is the target determination position (RC8: the first determination position DP1), the CPU 30 goes to a process RC9. When determining that the second determination position DP2 is the target determination position (RC8: the second determination position DP2), the CPU 30 goes to a process RC10. When determining that the third determination position DP3 is the target determination position (RC8: the third determination position DP3), the CPU 30 goes to a process RC11.

When determining that the first determination position DP1 is the target determination position (RC8: the first determination position DP1), the CPU 30 sets the second determination position DP2 as a target determination position (RC9). After completion of the process RC9, the CPU 30 goes to the process RC2.

When determining that the second determination position DP2 is the target determination position (RC8: the second determination position DP2), the CPU 30 sets the third determination position DP3 as a target determination position (RC10). After completion of the process RC10, the CPU 30 goes to the process RC2.

When determining that the third determination position DP3 is the target determination position (RC8: the third determination position DP3), the CPU 30 sets the no-document flag OF to "ON" (RC11). After completion of the process RC11, the CPU 30 terminates the black edge detecting process RA2.

When determining that the first minimum difference value MNDV1 is equal to or more than the first black threshold BTH1 (RC6: Yes), the CPU 30 stores, into the RAM 32, the set target determination position as an end determination position EDP (RC12).

The CPU 30 stores a document leading-end position OHP (RC13). Specifically, the CPU 30 stores, into the RAM 32, a position of the pixel corresponding to the pixel number SPN associated with the black edge minimum value BEMN, as a document leading-end position OHP in the sub scanning direction. Further, the CPU 30 stores, into the RAM 32, the target determination position as a document leading-end position OHP in the main scanning direction. It is noted that the position of the pixel corresponding to the pixel number SPN is, for instance, a position of the $100^{th}$ pixel from the scanning start position SP in the sub scanning direction when the pixel number SPN is 100.

The CPU 30 stores, into the RAM 32, the black edge minimum value BEMN as a black edge value BEV (RC14).

The CPU 30 calculates the background color average BGAV (RC15). Specifically, the CPU 30 calculates the background color average BGAV by averaging background color gradation values. It is noted that the background color gradation values are gradation values GV of 100 pixels successively arranged from a specific pixel in the downstream direction along the sub scanning direction. The specific pixel is located 100 pixels away, in the downstream direction along the sub scanning direction, from the document leading-end position OHP in the target determination position in the main scanning direction.

The CPU 30 calculates the background color deviation BGD (RC16). Specifically, the CPU 30 calculates, as the background color deviation BGD, a standard deviation of the 100 background color gradation values. After completion of the process RC16, the CPU 30 terminates the black edge detecting process RA2, and returns to the document detecting process R6 (see FIGS. 5A and 5B).

(Document Leading-End Detecting Process)

When the document leading-end detecting process RA6 (see FIG. 8) is started, the CPU 30 sets a group of upstream target pixels (RD1). Specifically, the CPU 30 sets, as a group of upstream target pixels, 21 pixels including a first reference pixel, 10 upstream pixels, and 10 downstream pixels. It is noted that the first reference pixel is adjacent to an upstream end, in the main scanning direction, of a pixel located in a most upstream document leading-end position OHP in the main scanning direction. The 10 upstream pixels are successively-arranged pixels adjacent to an upstream end of the first reference pixel in the sub scanning direction. The 10 downstream pixels are successively-arranged pixels adjacent to a downstream end of the first reference pixel in the sub scanning direction. When the group of the upstream target pixels is not set, the position stored in the process RC13 is set as the most upstream document leading-end position OHP in the main scanning direction.

The CPU 30 detects the minimum value of gradation values GV of the upstream target pixels (RD2).

The CPU 30 calculates a second minimum difference value MNDV2 (RD3). Specifically, the CPU 30 calculates the second minimum difference value MNDV2 by subtracting the minimum value detected in the process RD2 from the cover color average CCAV.

The CPU 30 determines whether the second minimum difference value MNDV2 is equal to or more than the first black threshold BTH1 (RD4). When determining that the second minimum difference value MNDV2 is less than the first black threshold BTH1 (RD4: No), the CPU 30 deletes settings for the upstream target pixels, and goes to a process RD6. Meanwhile, when determining that the second minimum difference value MNDV2 is equal to or more than the first black threshold BTH1 (RD4: Yes), the CPU 30 goes to a process RD5.

The CPU 30 stores a document leading-end position OHP and a black edge value BEV (RD5). Specifically, the CPU 30 stores, into the RAM 32, a position of the set upstream target pixels in the main scanning direction as a document leading-end position OHP in the main scanning direction. Further, the CPU 30 stores, into the RAM 32, a position, in the sub scanning direction, of a pixel having the minimum value detected in the process RD2, as a document leading-end position OHP in the sub scanning direction. In addition, the CPU 30 stores, into the RAM 32, the minimum value detected in the process RD2, as a black edge value BEV. After completion of the process RD5, the CPU 30 goes to the process RD1.

When determining that the second minimum difference value MNDV2 is less than the first black threshold BTH1 (RD4: No), the CPU 30 sets a group of downstream target pixels (RD6). Specifically, the CPU 30 sets, as a group of downstream target pixels, 21 pixels including a second reference pixel, 10 upstream pixels, and 10 downstream pixels. It is noted that the second reference pixel is adjacent to a downstream end, in the main scanning direction, of a pixel located in a most downstream document leading-end position OHP in the main scanning direction. The 10 upstream pixels are successively-arranged pixels adjacent to an upstream end of the second reference pixel in the sub scanning direction. The 10 downstream pixels are successively-arranged pixels adjacent to a downstream end of the second reference pixel in the sub scanning direction. When the group of the downstream target pixels is not set, the position stored in the process RC13 is set as the most downstream document leading-end positions OHP in the main scanning direction.

The CPU 30 detects the minimum value of gradation values GV of the downstream target pixels (RD7).

The CPU 30 calculates a third minimum difference value MNDV3 (RD8). Specifically, the CPU 30 calculates the third minimum difference value MNDV3 by subtracting the minimum value detected in the process RD7 from the cover color average CCAV.

The CPU 30 determines whether the third minimum difference value MNDV3 is equal to or more than the first black threshold BTH1 (RD9). When determining that the third minimum difference value MNDV3 is less than the first black threshold BTH1 (RD9: No), the CPU 30 deletes settings for the downstream target pixels, and goes to a process RD11. Meanwhile, when determining that the third minimum difference value MNDV3 is equal to more than the first black threshold BTH1 (RD9: Yes), the CPU 30 goes to a process RD10.

The CPU 30 stores a document leading-end position OHP and a black edge value BEV (RD10). Specifically, the CPU 30 stores, into the RAM 32, a position of the set downstream target pixels in the main scanning direction as a document leading-end position OHP in the main scanning direction. Further, the CPU 30 stores into the RAM 32 a position, in the sub scanning direction, of a pixel having the minimum value detected in the process RD7, as a document leading-end position OHP in the sub scanning direction. In addition, the CPU 30 stores, into the RAM 32, the minimum value detected in the process RD7, as a black edge value BEV. After completion of the process RD10, the CPU 30 goes to the process RD6.

The CPU 30 calculates a black edge value deviation BED (RD11). Specifically, the CPU 30 calculates, as the black edge value deviation BED, a standard deviation of all black edge values BEV including the black edge value BEV stored in the process RC 14, the black edge values BEV stored in the process RDS, and the black edge values BEV stored in the process RD10. After completion of the process RD11, the CPU 30 terminates the document leading-end detecting process RA6, and returns to the document detecting process R6 (see FIGS. 5A and 5B).

(Background Color Edge Detecting Process)

Figure 9:
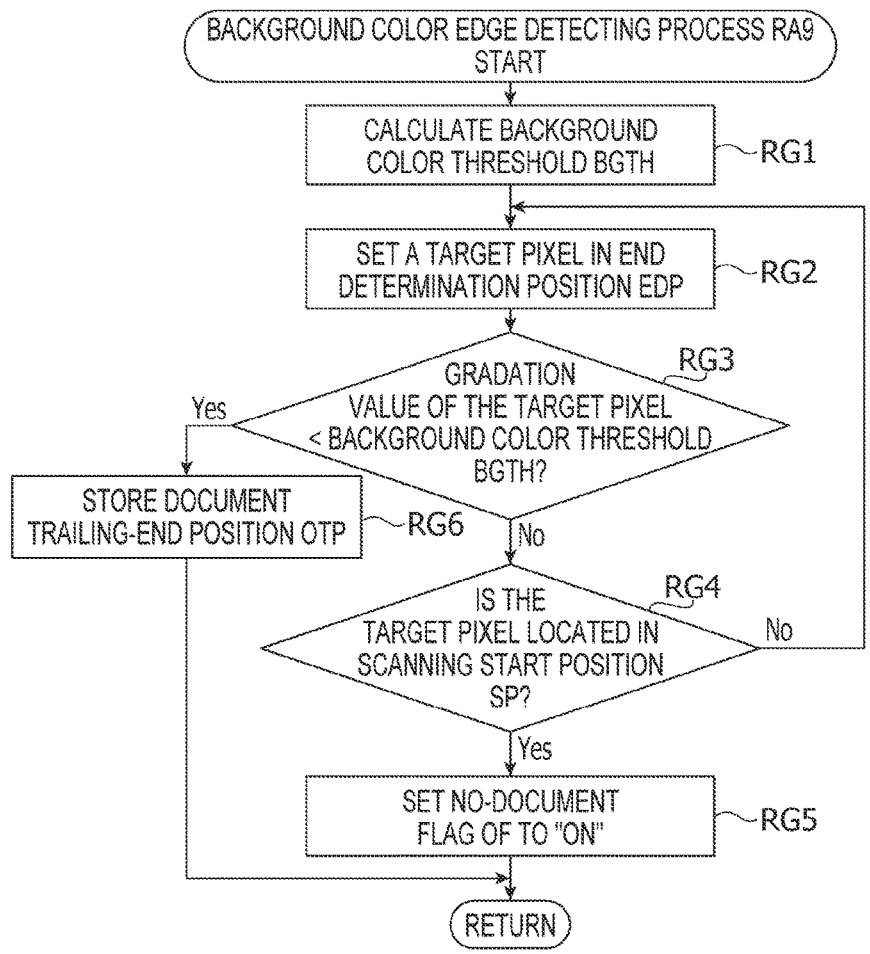
FIG. 9 is a flowchart showing a procedure of a background color edge detecting process in the illustrative embodiment according to one or more aspects of the present disclosure.

When the background color edge detecting process RA9 (see FIG. 9) is started, the CPU 30 calculates the background color threshold BGTH (RG1). Specifically, the CPU 30 calculates the background color threshold BGTH by averaging the cover color average CCAV and the background color average BGAV.

The CPU 30 sets a target pixel in the end determination position EDP (RG2). Specifically, the CPU 30 sets, as a new target pixel, a pixel adjacent to an upstream end of a current target pixel in the sub scanning direction, in the end determination position EDP in the main scanning direction. When there is no target pixel currently set, the CPU 30 sets, as a target pixel, a pixel located in the end determination position EDP in the main scanning direction and in the scanning end position EP in the sub scanning direction.

The CPU 30 determines whether a gradation value GV of the target pixel is less than the background color threshold BGTH (RG3). When determining that the gradation value GV of the target pixel is less than the background color threshold BGTH (RG3: Yes), the CPU 30 deletes settings for the target pixel and goes to a process RG6. Meanwhile, when determining that the gradation value GV of the target pixel is equal to or more than the background color threshold BGTH (RG3: No), the CPU 30 goes to a process RG4.

The CPU 30 determines whether the target pixel is a pixel located in the scanning start position SP in the sub scanning direction (RG4). When determining that the target pixel is not a pixel located in the scanning start position SP in the sub scanning direction (RG4: No), the CPU 30 goes to the process RG2. Meanwhile, when determining that the target pixel is a pixel located in the scanning start position SP in the sub scanning direction (RG4: Yes), the CPU 30 deletes settings for the target pixel and goes to a process RG5.

The CPU 30 sets the no-document flag OF to "ON" (RG5). After completion of the process RG5, the CPU 30 terminates the background color edge detecting process RA9.

The CPU 30 stores a document trailing-end position OTP (RG6). Specifically, the CPU 30 stores, into the RAM 32, a position of the target pixel in the main scanning direction as a document trailing-end position OTP in the main scanning direction. Further, the CPU 30 stores, into the RAM 32, a position of the target pixel in the sub scanning direction as a document trailing-end position OTP in the sub scanning direction. After completion of the process RG6, the CPU 30 terminates the background color edge detecting process RA9, and returns to the document detecting process R6 (see FIGS. 5A and 5B).

(Thin-Paper White Edge Detecting Process)

Figure 10A:
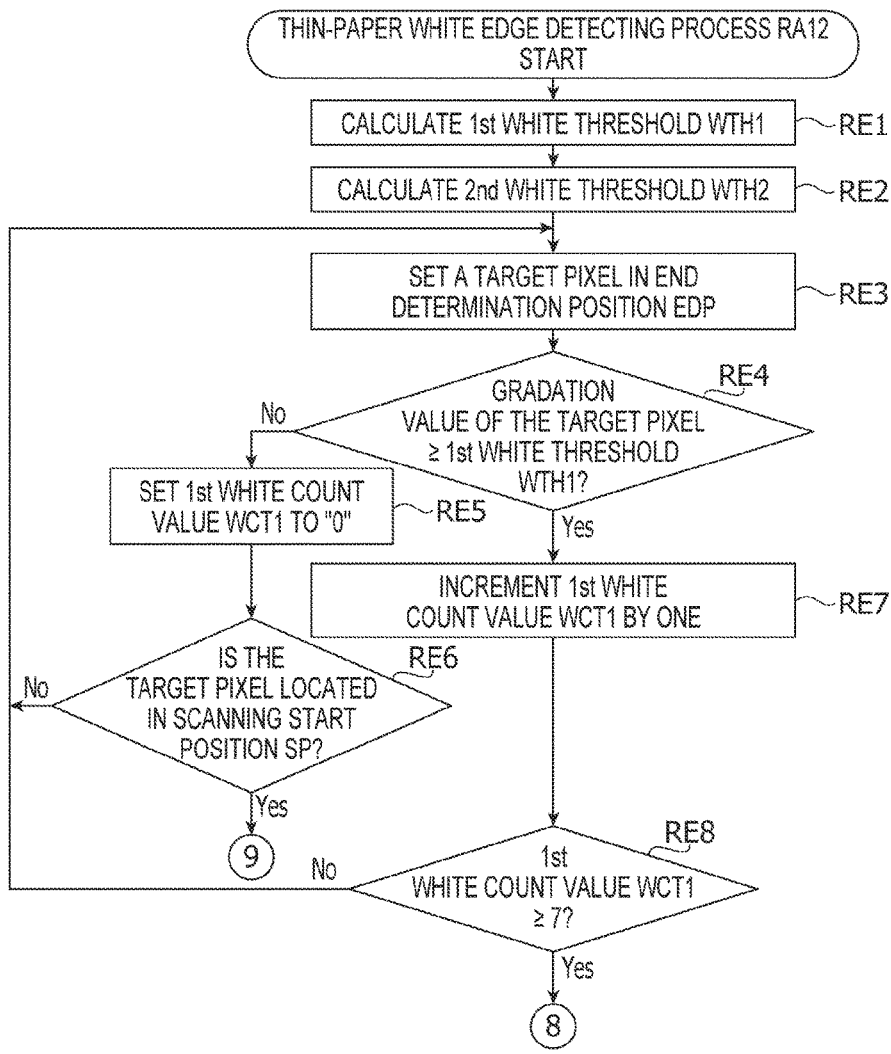
FIGS. 10A and 10B are flowcharts showing a procedure of a thin-paper white edge detecting process in the illustrative embodiment according to one or more aspects of the present disclosure.
Figure 10B:
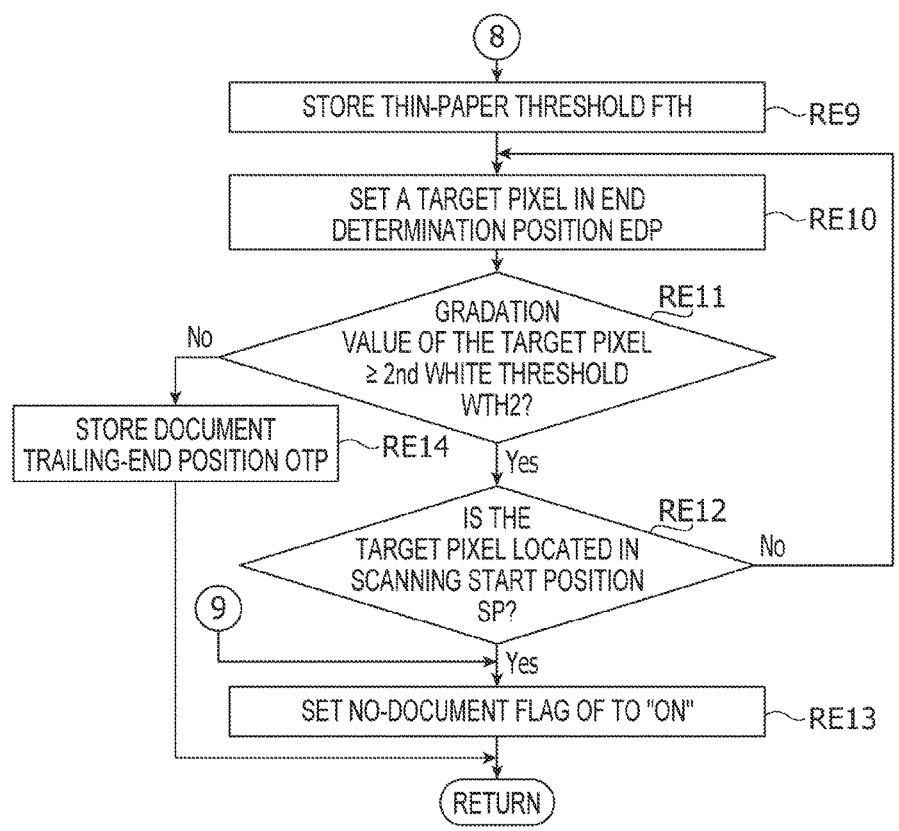

When the thin-paper white edge detecting process RA12 (see FIGS. 10A and 10B) is started, the CPU 30 calculates a first white threshold WTH1 (RE1). Specifically, the CPU 30 calculates the first white threshold WTH1 by adding the cover color deviation CCD to the cover color average CCAV.

The CPU 30 calculates a second white threshold WTH2 (RE2). Specifically, the CPU 30 calculates the second white threshold WTH2 by adding the background color deviation BGD to the background color average BGAV.

The CPU 30 sets a target pixel in the end determination position EDP (RE3). Specifically, the CPU 30 sets, as a new target pixel, a pixel adjacent to an upstream end of a current target pixel in the sub scanning direction, in the end determination position EDP in the main scanning direction. When there is no target pixel currently set, the CPU 30 sets, as a target pixel, a pixel located in the end determination position EDP in the main scanning direction and in the scanning end position EP in the sub scanning direction.

The CPU 30 determines whether a gradation value GV of the target pixel is equal to or more than the first white threshold WTH1 (RE4). When determining that the gradation value GV of the target pixel is equal to or more than the first white threshold WTH1 (RE4: Yes), the CPU 30 goes to a process RE7. Meanwhile, when determining that the gradation value GV of the target pixel is less than the first white threshold WTH1 (RE4: No), the CPU 30 goes to a process RE5. In the process RE5, the CPU 30 sets the first white count value WCT1 to zero (RE5).

The CPU 30 determines whether the target pixel is a pixel located in the scanning start position SP in the sub scanning direction (RE6). When determining that the target pixel is not a pixel located in the scanning start position SP in the sub scanning direction (RE6: No), the CPU 30 goes to the process RE3. Meanwhile, when determining that the target pixel is a pixel located in the scanning start position SP in the sub scanning direction (RE6: Yes), the CPU 30 deletes settings for the target pixel and goes to a process RE13.

When determining that the gradation value GV of the target pixel is equal to or more than the first white threshold WTH1 (RE4: Yes), the CPU 30 increments the first white count value WCT1 by one (RE7).

The CPU 30 determines whether the first white count value WCT1 is equal to or more than 7 (RE8). When determining that the first white count value WCT1 is less than 7 (RE8: No), the CPU 30 goes to the process RE3. When determining that the first white count value WCT1 is equal to or more than 7 (RE8: Yes), the CPU 30 sets the first white count value WCT1 to zero, and goes to the process RE9.

The CPU 30 stores a thin-paper threshold FTH (RE9). Specifically, the CPU 30 stores, into the RAM 32, the gradation value GV of the target pixel as a thin-paper threshold FTH.

The CPU 30 sets a target pixel in the end determination position EDP (RE10). Specifically, the CPU 30 sets, as a new target pixel, a pixel adjacent to an upstream end of the current target pixel in the sub scanning direction, in the end determination position EDP in the main scanning direction.

The CPU 30 determines whether the gradation value GV of the target pixel is equal to or more than the second white threshold WTH2 (RE11). When determining that the gradation value GV of the target pixel is less than the second white threshold WTH2 (RE11: No), the CPU 30 deletes settings for the target pixel and goes to a process RE14. Meanwhile, when determining that the gradation value GV of the target pixel is equal to or more than the second white threshold WTH2 (RE11: Yes), the CPU 30 goes to a process RE12.

The CPU 30 determines whether the target pixel is a pixel located in the scanning start position SP in the sub scanning direction (RE12). When determining that the target pixel is not a pixel located in the scanning start position SP in the sub scanning direction (RE12: No), the CPU 30 goes to the process RE10. Meanwhile, when determining that the target pixel is a pixel located in the scanning start position SP in the sub scanning direction (RE12: Yes), the CPU 30 deletes settings for the target pixel and goes to the process RE13.

The CPU 30 sets the no-document flag OF to "ON" (RE13). After completion of the process RE13, the CPU 30 terminates the thin-paper white edge detecting process RA12.

When determining that the gradation value GV of the target pixel is less than the second white threshold WTH2 (RE11: No), the CPU 30 stores a document trailing-end position OTP (RE14). Specifically, the CPU 30 stores, into the RAM 32, a position of the target pixel in the main scanning direction as a document trailing-end position OTP in the main scanning direction. Further, the CPU 30 stores, into the RAM 32, a position of the target pixel in the sub scanning direction as a document trailing-end position OTP in the sub scanning direction. After completion of the process RE14, the CPU 30 terminates the thin-paper white edge detecting process RA12, and returns to the document detecting process R6 (see FIGS. 5A and 5B).

(Thick-Paper White Edge Detecting Process)

Figure 11:
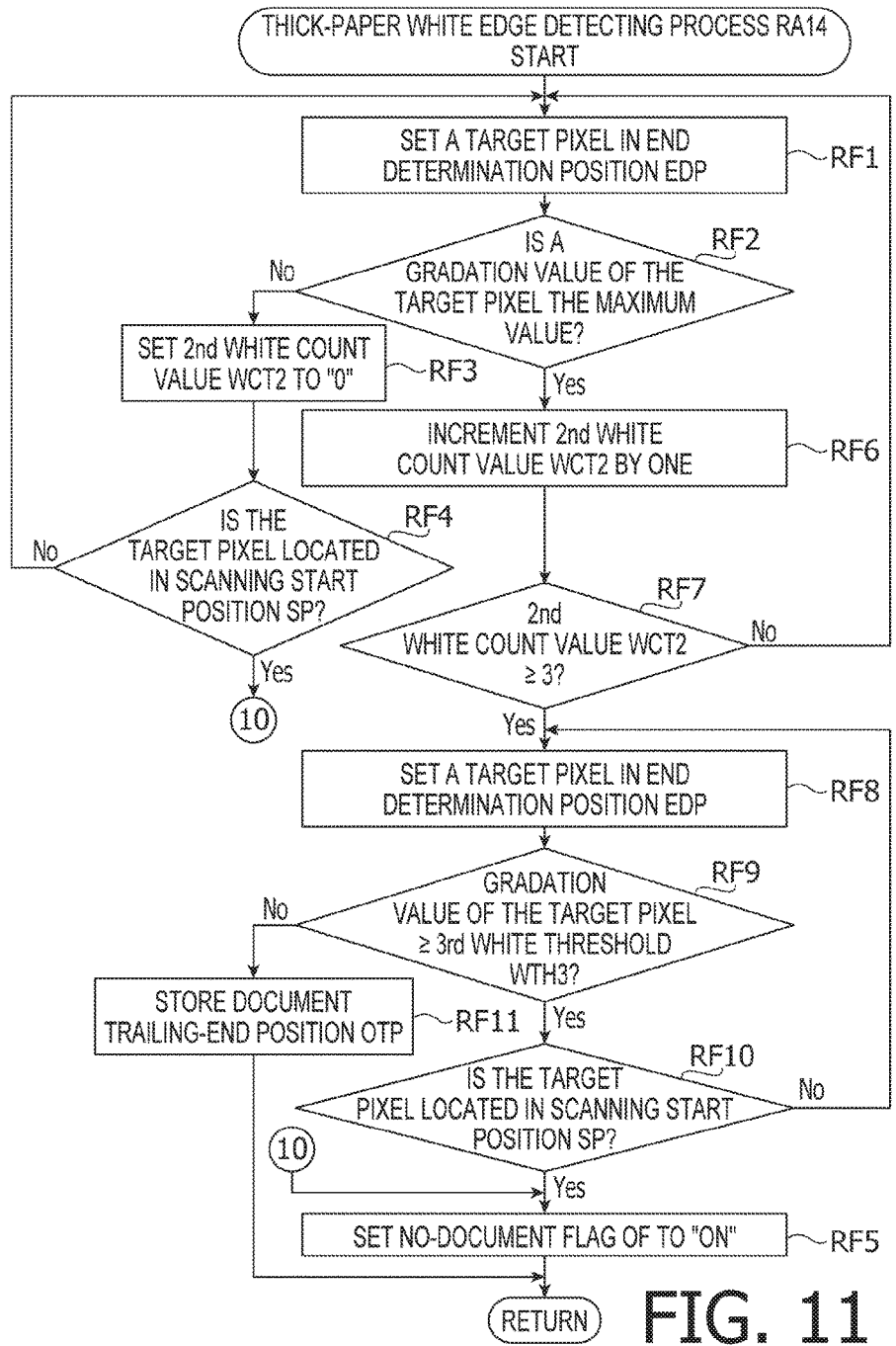
FIG. 11 is a flowchart showing a procedure of a thick-paper white edge detecting process in the illustrative embodiment according to one or more aspects of the present disclosure.

When the thick-paper white edge detecting process RA14 (see FIG. 11) is started, the CPU 30 sets a target pixel in the end determination position EDP (RF1). Specifically, the CPU 30 sets, as a new target pixel, a pixel adjacent to an upstream end of a current target pixel in the sub scanning direction, in the end determination position EDP in the main scanning direction. When there is no target pixel currently set, the CPU 30 sets, as a target pixel, a pixel located in the end determination position EDP in the main scanning direction and in the scanning end position EP in the sub scanning direction.

The CPU 30 determines whether a gradation value GV of the target pixel is the maximum value (RF2). When determining that the gradation value GV of the target pixel is the maximum value (RF2: Yes), the CPU 30 goes to a process RF6. Meanwhile, when determining that the gradation value GV of the target pixel is not the maximum value (RF2: No), the CPU 30 goes to a process RF3. In the process RF3, the CPU 30 sets the second white count value WCT2 to zero (RF3).

The CPU 30 determines whether the target pixel is a pixel located in the scanning start position SP in the sub scanning direction (RF4). When determining that the target pixel is not a pixel located in the scanning start position SP in the sub scanning direction (RF4: No), the CPU 30 goes to the process RF1. Meanwhile, when determining that the target pixel is a pixel located in the scanning start position SP in the sub scanning direction (RF4: Yes), the CPU 30 deletes settings for the target pixel and goes to a process RF5.

The CPU 30 sets the no-document flag OF to "ON" (RF5). After completion of the process RF5, the CPU 30 terminates the thick-paper white edge detecting process RA14.

When determining that the gradation value GV of the target pixel is the maximum value (RF2: Yes), the CPU 30 increments the second white count value WCT2 by one (RF6).

The CPU 30 determines whether the second white count value WCT2 is equal to or more than 3 (RF7). When determining that the second white count value WCT2 is less than 3 (RF7: No), the CPU 30 goes to the process RF1. Meanwhile, when determining that the second white count value WCT2 is equal to or more than 3 (RF7: Yes), the CPU 30 sets the second white count value WCT2 to zero, and goes to a process RF8.

The CPU 30 sets a target pixel in the end determination position EDP (RF8). Specifically, the CPU 30 sets, as a new target pixel, a pixel adjacent to an upstream end of a current target pixel in the sub scanning direction, in the end determination position EDP in the main scanning direction.

The CPU 30 determines whether a gradation value GV of the target pixel is equal to or more than the third white threshold WTH3 (RF9). When determining that the gradation value GV of the target pixel is less than the third white threshold WTH3 (RF9: No), the CPU 30 goes to a process RF11. Meanwhile, when determining that the gradation value GV of the target pixel is equal to or more than the third white threshold WTH3 (RF9: Yes), the CPU 30 goes to a process RF10.

The CPU 30 determines whether the target pixel is a pixel located in the scanning start position SP in the sub scanning direction (RF10). When determining that the target pixel is not a pixel located in the scanning start position SP in the sub scanning direction (RF10: No), the CPU 30 goes to the process RF8. Meanwhile, when determining that the target pixel is a pixel located in the scanning start position SP in the sub scanning direction (RF10: Yes), the CPU 30 deletes settings for the target pixel and goes to the process RF5.

When determining that the gradation value GV of the target pixel is less than the third white threshold WTH3 (RF9: No), the CPU 30 stores a document trailing-end position OTP (RF11). Specifically, the CPU 30 stores, into the RAM 32, a position of the target pixel in the main scanning direction as a document trailing-end position OTP in the main scanning direction. Further, the CPU 30 stores, into the RAM 32, a position of the target pixel in the sub scanning direction as a document trailing-end position OTP in the sub scanning direction. After completion of the process RF11, the CPU 30 terminates the thick-paper white edge detecting process RA14, and returns to the document detecting process R6 (see FIGS. 5A and 5B).

(Document Trailing-End Detecting Process)

Figure 12A:
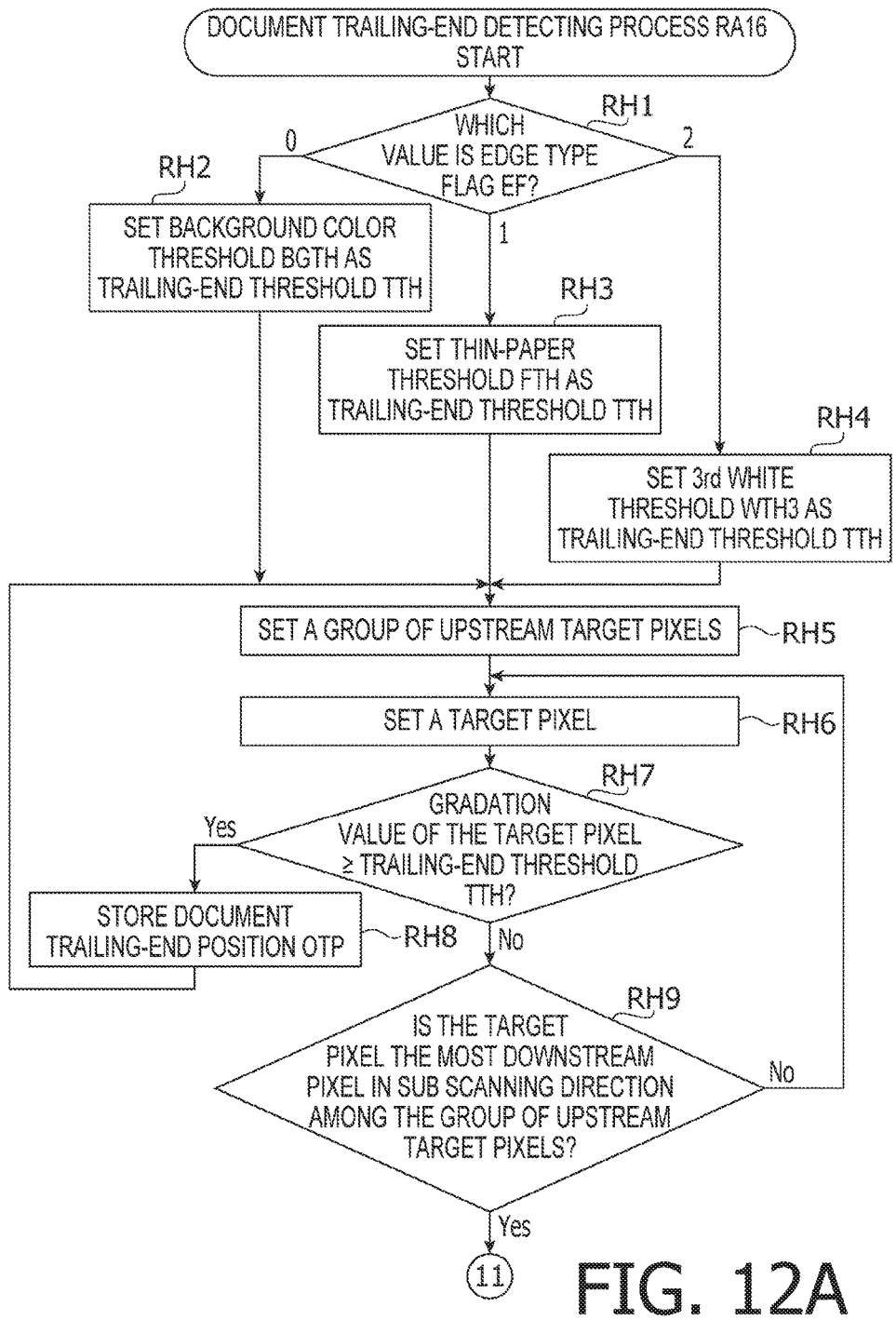
FIGS. 12A and 12B are flowcharts showing a procedure of a document trailing-end detecting process in the illustrative embodiment according to one or more aspects of the present disclosure.
Figure 12B:
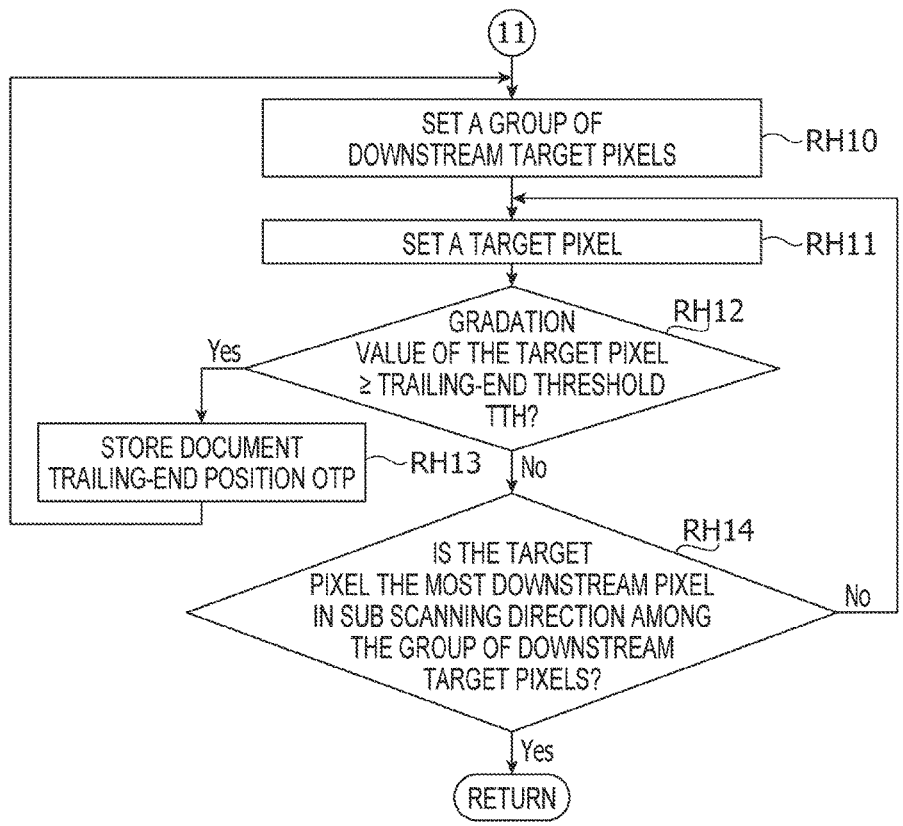

When the document trailing-end detecting process RA16 (see FIGS. 12A and 12B) is started, the CPU 30 determines which value the edge type flag EF is (RH1). When the edge type flag EF is 0 (RH1: 0), the CPU 30 sets the background color threshold BGTH as a trailing-end threshold TTH (RH2). When the edge type flag EF if 1 (RH1: 1), the CPU 30 sets the thin-paper threshold FTH as a trailing-end threshold TTH (RH3). When the edge type flag EF is 2 (RH1: 2), the CPU 30 sets the third white threshold WTH3 as a trailing-end threshold TTH (RH4). After completion of the process RH2, the process RH3, or the process RH4, the CPU 30 goes to a process RH5.

The CPU 30 sets a group of upstream target pixels (RH5). Specifically, the CPU 30 sets, as a group of upstream target pixels, 21 pixels including a third reference pixel, 10 upstream pixels, and 10 downstream pixels. It is noted that the third reference pixel is adjacent to an upstream end, in the main scanning direction, of a pixel located in a most upstream document trailing-end position OTP in the main scanning direction. The 10 upstream pixels are successively-arranged pixels adjacent to an upstream end of the third reference pixel in the sub scanning direction. The 10 downstream pixels are successively-arranged pixels adjacent to a downstream end of the third reference pixel in the sub scanning direction. When the group of the upstream target pixels is not set, the document trailing-end position OTP stored in the process RG6, the process RF11, or the process RE14 is set as the most upstream document trailing-end position OTP in the main scanning direction.

The CPU 30 sets a target pixel from among the group of the upstream target pixels (RH6). Specifically, the CPU 30 sets, as a new target pixel, a pixel adjacent to a downstream end of a current target pixel in the sub scanning direction. When there is no target pixel currently set, the CPU 30 sets, as a target pixel, the most upstream pixel in the sub scanning direction among the group of the upstream target pixels.

The CPU 30 determines whether a gradation value GV of the target pixel is equal to or more than the trailing-end threshold TTH (RH7). When determining that the gradation value GV of the target pixel is less than the trailing-end threshold TTH (RH7: No), the CPU 30 goes to a process RH9. Meanwhile, when determining that the gradation value GV of the target pixel is equal to or more than the trailing-end threshold TTH (RH7: Yes), the CPU 30 goes to a process RH8.

The CPU 30 stores a document trailing-end position OTP (RH8). Specifically, the CPU 30 stores, into the RAM 32, a position of the target pixel in the main scanning direction as a document trailing-end position OTP in the main scanning direction. Further, the CPU 30 stores, into the RAM 32, a position of the target pixel in the sub scanning direction as a document trailing-end position OTP in the sub scanning direction. After completion of the process RH8, the CPU 30 goes to the process RH5.

When determining that the gradation value GV of the target pixel is less than the trailing-end threshold TTH (RH7: No), the CPU 30 determines whether the target pixel is the most downstream pixel in the sub scanning direction among the group of the upstream target pixels (RH9). When determining that the target pixel is not the most downstream pixel in the sub scanning direction among the group of the upstream target pixels (RH9: No), the CPU 30 goes to the process RH6. Meanwhile, when determining that the target pixel is the most downstream pixel in the sub scanning direction among the group of the upstream target pixels (RH9: Yes), the CPU 30 goes to a process RH10.

The CPU 30 sets a group of downstream target pixels (RH10). Specifically, the CPU 30 sets, as a group of downstream target pixels, 21 pixels including a fourth reference pixel, 10 upstream pixels, and 10 downstream pixels. It is noted that the fourth reference pixel is adjacent to an upstream end, in the main scanning direction, of a pixel located in a most downstream document trailing-end position OTP in the main scanning direction. The 10 upstream pixels are successively-arranged pixels adjacent to an upstream end of the fourth reference pixel in the sub scanning direction. The 10 downstream pixels are successively-arranged pixels adjacent to a downstream end of the fourth reference pixel in the sub scanning direction. When the group of the downstream target pixels is not set, the document trailing-end position OTP stored in the process RG6, the process RF11, or the process RE14 is set as the most downstream document trailing-end position OTP in the main scanning direction.

The CPU 30 sets a target pixel from among the group of the downstream target pixels (RH11). Specifically, the CPU 30 sets, as a new target pixel, a pixel adjacent to a downstream end of a current target pixel in the sub scanning direction. When there is no target pixel currently set, the CPU 30 sets, as a target pixel, the most upstream pixel in the sub scanning direction among the group of the upstream target pixels.

The CPU 30 determines whether a gradation value GV of the target pixel is equal to or more than the trailing-end threshold TTH (RH12). When determining that the gradation value GV of the target pixel is less than the trailing-end threshold TTH (RH12: No), the CPU 30 goes to a process RH14. Meanwhile, when determining that the gradation value GV of the target pixel is equal to or more than the trailing-end threshold TTH (RH12: Yes), the CPU 30 goes to a process RH13.

The CPU 30 stores a document trailing-end position OTP (RH8). Specifically, the CPU 30 stores, into the RAM 32, a position of the target pixel in the main scanning direction as a document trailing-end position OTP in the main scanning direction. Further, the CPU 30 stores, into the RAM 32, a position of the target pixel in the sub scanning direction as a document trailing-end position OTP in the sub scanning direction. After completion of the process RH13, the CPU 30 goes to the process RH10.

When determining that the gradation value GV of the target pixel is less than the trailing-end threshold TTH (RH12: No), the CPU 30 determines whether the target pixel is the most downstream pixel in the sub scanning direction among the group of the downstream target pixels (RH14). When determining that the target pixel is not the most downstream pixel in the sub scanning direction among the group of the downstream target pixels (RH14: No), the CPU 30 goes to the process RH11. Meanwhile, when determining that the target pixel is the most downstream pixel in the sub scanning direction among the group of the downstream target pixels (RH14: Yes), the CPU 30 terminates the document trailing-end detecting process RA16, and returns to the document detecting process R6 (see FIGS. 5A and 5B).

(Specific Examples)

As shown in FIG. 2, an explanation will be provided about a case where an A5-size document sheet GS is placed on the document table DT with a long side thereof set along the sub scanning direction. Referring to FIGS. 13 and 7, a procedure to detect a document leading-end position OHP in the second determination position DP2 in the black edge detecting process RA2 will be described.

As shown in FIG. 13, in the second determination position DP2 in the main scanning direction, respective gradation values GV of the $101^{st}$ pixel to the $112^{th}$ pixel in the sub scanning direction are 232, 229, 230, 228, 229, 224, 219, 207, 173, 129, 82, and 124.

When the black edge detecting process RA2 is started, the CPU 30 sets the first determination position DP1 as a target determination position (RC1). As shown in FIG. 2, the document sheet GS is not in the first determination position DP1. Therefore, in the process RC6, the first minimum difference value MNDV1 is not equal to or more than the first black threshold BTH1. When determining that the target pixel is the final pixel (RC7: Yes), the CPU 30 determines that the target determination position is the first determination position DP1 (RCB: the first determination position DP1), and sets the second determination position DP2 as a target determination position (RC9).

In the second determination position DP2, the CPU 30 scans the document cover CV in a range from the pixel located in the scanning start position SP to the $108^{th}$ pixel in the sub scanning direction. Therefore, in the process RC6, the first minimum difference value MNDV1 is not equal to or more than the first black threshold BTH1. Thus, the CPU 30 repeatedly performs the processes RC2 to RC7. The CPU 30 sets, as a target pixel, the $109^{th}$ pixel in the sub scanning direction (RC2). The CPU 30 determines that the gradation value GV "173" of the target pixel is less than the black edge minimum value BEMN "207" (RC3: Yes). The CPU 30 stores, into the RAM 32, the gradation value GV "173" of the target pixel as a black edge minimum value BEMN (RC4), and goes to the process RC2.

The CPU 30 sets, as a target pixel, the $110^{th}$ pixel in the sub scanning direction (RC2). The CPU 30 determines that the gradation value GV "129" of the target pixel is less than the black edge minimum value BEMN "173" (RC3: Yes). The CPU 30 stores, into the RAM 32, the gradation value GV "129" of the target pixel as a black edge minimum value BEMN (RC4), and goes to the process RC2.

The CPU 30 sets, as a target pixel, the $111^{th}$ pixel in the sub scanning direction (RC2). The CPU 30 determines that the gradation value GV "82" of the target pixel is less than the black edge minimum value BEMN "129" (RC3: Yes). The CPU 30 stores, into the RAM 32, the gradation value GV "82" of the target pixel as a black edge minimum value BEMN (RC4), and goes to the process RC2.

The CPU 30 sets, as a target pixel, the $112^{th}$ pixel in the sub scanning direction (RC2). The CPU 30 determines that the gradation value GV "124" of the target pixel is equal to or more than the black edge minimum value BEMN "82" (RC3: No). The CPU 30 determines a first minimum difference value MNDV1 to be 148, by subtracting a black edge minimum value BEMN "82" from a cover color average CCAV "230" (RC5). The CPU 30 determines that the first minimum difference value MNDV1 "148" is less than a first black threshold BTH1 "216" (RC6: Yes). The CPU 30 stores, into the RAM 32, the second determination position DP2 in the main scanning direction and the $112^{th}$-pixel position in the sub scanning direction as a document leading-end position OHP (RC13).

Figure 8:
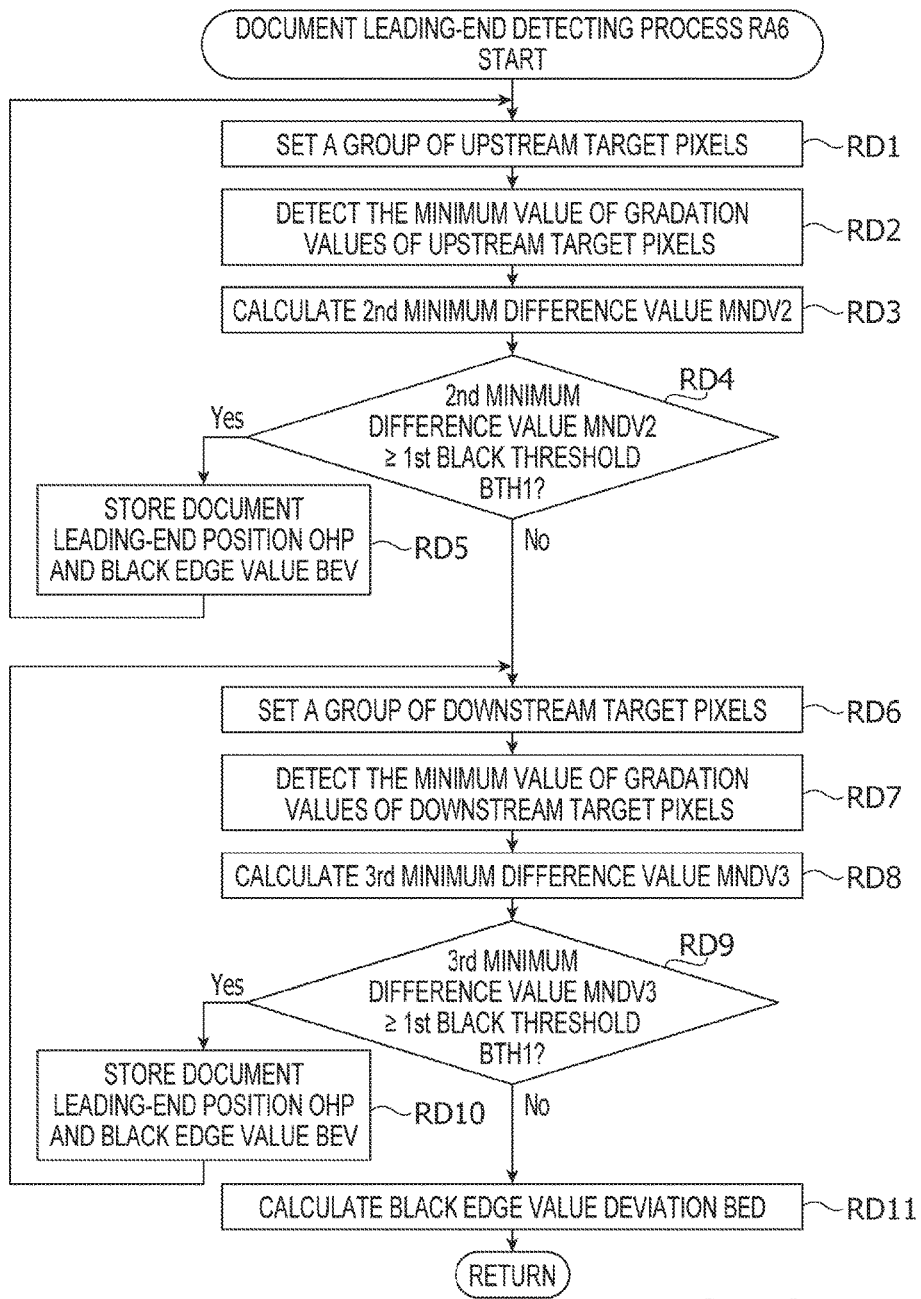
FIG. 8 is a flowchart showing a procedure of a document leading-end detecting process in the illustrative embodiment according to one or more aspects of the present disclosure.

Subsequently, referring to FIGS. 14 and 8, a procedure to detect a document leading-end position OHP in the $500^{th}$-pixel position in the main scanning direction in the document leading-end detecting process RA6 will be described.

As shown in FIG. 14, in the $500^{th}$-pixel position in the main scanning direction, respective gradation values GV of the $100^{th}$ pixel to the $120^{th}$ pixel in the sub scanning direction are 236, 235, 229, 224, 228, 225, 219, 215, 200, 169, 112, 105, 158, 179, 186, 211, 231, 232, 221, 230, and 233.

When the document leading-end detecting process RA6 is started, the CPU 30 repeatedly performs the processes RD1 to RDS, thereby detecting a document leading-end position OHP in each position of the $670^{th}$-pixel position (i.e., the second determination position DP2) to the $501^{st}$-pixel position in the main scanning direction. The CPU 30 sets, as a group of upstream target pixels, 21 pixels including a first reference pixel, 10 upstream pixels, and 10 downstream pixels (RD1). It is noted that the first reference pixel is adjacent to an upstream end, in the main scanning direction, of a pixel located in the document leading-end position OHP in the $501^{st}$-pixel position in the main scanning direction. The 10 upstream pixels are successively-arranged pixels adjacent to an upstream end of the first reference pixel in the sub scanning direction. The 10 downstream pixels are successively-arranged pixels adjacent to a downstream end of the first reference pixel in the sub scanning direction. In other words, the first reference pixel is located in the $500^{th}$-pixel position in the main scanning direction, and is adjacent to an upstream end, in the main scanning direction, of a pixel located in the document leading-end position OHP, which is the $501^{st}$-pixel position in the main scanning direction and the $110^{th}$-pixel position in the sub scanning direction. The 10 upstream pixels are successively arranged on the upstream end of the $110^{th}$ pixel in the sub scanning direction, in the $500^{th}$-pixel position in the main scanning direction. The 10 downstream pixels are successively arranged on the downstream end of the $110^{th}$ pixel in the sub scanning direction, in the $500^{th}$-pixel position in the main scanning direction. Namely, in the process RD1, in the $500^{th}$-pixel position in the main scanning direction, the $100^{th}$ to 120$^{th}$ pixels in the sub scanning direction are set as the group of the upstream target pixels.

The CPU 30 detects the minimum gradation value GV "105" among the gradation values GV of the upstream target pixels (RD2). The CPU 30 determines a second minimum difference value MNDV2 to be 125, by subtracting the minimum gradation value GV "105" from the cover color average CCAV "230" (RD3). The CPU 30 determines that the second minimum difference value MNDV2 "125" is less than the first black threshold BTH1 "216" (RD4: Yes). The CPU 30 stores, into the RAM 32, the 500$^{th}$-pixel position in the main scanning direction and the 111$^{th}$-pixel position in the sub scanning direction as a document leading-end position OHP (RD5).

Next, referring to FIGS. 15 and 10, a procedure to detect a document trailing-end position OTP in the second determination position DP2 in the thin-paper white edge detecting process RA12 will be described.

As shown in FIG. 15, in the second determination position DP2, respective gradation values GV of the 2571$^{st}$ pixel to the 2600$^{th}$ pixel in the sub scanning direction are 229, 231, 227, 243, 228, 243, 234, 228, 233, 236, 236, 243, 245, 240, 238, 249, 255, 255, 255, 254, 253, 252, 249, 244, 240, 237, 238, 242, 242, and 235. In this case, the gradation values GV of the 2574$^{th}$ pixel, the 2576$^{th}$ pixel, the 2582$^{nd}$ pixel, and the 2583$^{rd}$ pixel are higher than the gradation values GV of their neighbor pixels, due to influences of transmitted light.

When the thin-paper white edge detecting process RA12 is started, the CPU 30 determines a first white threshold WTH1 to be 237, by adding a cover color deviation CCD "7" to the cover color average CCAV "230" (RE1). The CPU 30 determines a second white threshold WTH2 to be 242, by adding a background color deviation BGD "10" to the background color average BGAV "232" (RE2).

In the second determination position DP2 that is the end determination position EDP, the document cover CV is scanned within a range from a pixel located in the scanning end position EP to the 2600$^{th}$ pixel in the sub scanning direction. Therefore, all gradation values GV of seven successive pixels in the range are not equal to or more than the first white threshold WTH1. Hence, the CPU 30 repeatedly performs the processes RE3 to RE8. The CPU 30 sets, as a target pixel, the 2599$^{th}$ pixel in the sub scanning direction (RE3). The CPU 30 determines that the gradation value GV "242" of the target pixel is equal to or more than the first white threshold WTH1 "237" (RE4: Yes). The CPU 30 increments the first white count value WCT1 "0" by one (RE7). The CPU 30 determines that the first white count value WCT1 "1" is less than 7 (RE8: No), and goes to the process RE3. With respect to the 2598$^{th}$ pixel to the 2593$^{rd}$ pixel in the sub scanning direction, the gradation values GV thereof are equal to or more than 237. Therefore, the CPU 30 repeatedly performs the processes RE3 to RE8 until the first white count value WCT1 becomes 7 after being repeatedly incremented by one in the process RE7.

The CPU 30 determines that the first white count value WCT1 is equal to or more than 7 (RE8: Yes). The CPU 30 stores the gradation value GV "249" of the target pixel as a thin-paper threshold FTH (RE9). The CPU 30 sets, as a new target pixel, the 2592$^{nd}$ pixel in the sub scanning direction that is adjacent to an upstream end of the current target pixel in the sub scanning direction (RE10). The CPU 30 determines that the gradation value GV "252" of the target pixel is equal to or more than the second white threshold WTH2 "242" (RE11: Yes). The CPU 30 determines that the target pixel is not a pixel located in the scanning start position SP in the sub scanning direction (RE12: No), and goes to the process RE10. With respect to the 2591$^{st}$ pixel to the 2586$^{th}$ pixel in the sub scanning direction, the gradation values GV thereof are equal to or more than 242. Therefore, in the process RE11 for each of those pixels as a target pixel, the CPU 30 determines that the gradation value GV of the target pixel is equal to or more than the second white threshold WTH2 (RE11: Yes). Hence, the CPU 30 repeatedly performs the processes RE10 to RE12.

The CPU 30 sets, as a new target pixel, the 2585$^{th}$ pixel in the sub scanning direction that is adjacent to an upstream end of the current target pixel in the sub scanning direction (RE10). The CPU 30 determines that the gradation value GV "238" of the target pixel is less than the second white threshold WTH2 "242" (RE11: No). The CPU 30 stores, into the RAM 32, the second determination position DP2 in the main scanning direction and the 2585$^{th}$-pixel position in the sub scanning direction as a document trailing-end position OTP (RE14).

Subsequently, referring to FIGS. 16 and 12, a procedure to detect a document trailing-end position OTP in the 500$^{th}$-pixel position in the main scanning direction in the document trailing-end detecting process RA16 will be described.

As shown in FIG. 16, in the 500$^{th}$-pixel position in the main scanning direction, respective gradation values GV of the 2575$^{th}$ pixel to the 2595$^{th}$ pixel in the sub scanning direction are 240, 232, 225, 210, 221, 228, 242, 240, 246, 234, 234, 244, 255, 255, 253, 254, 253, 253, 249, 246, and 243. In this case, the gradation values GV of the 2581$^{st}$ pixel, the 2582$^{nd}$ pixel, and the 2583$^{rd}$ pixel are higher than the gradation values GV of their neighbor pixels, due to influences of transmitted light.

When the document trailing-end detecting process RA16 is started, the CPU 30 determines that the edge type flag EF is set to 1 (RH1: 1). The CPU 30 sets the thin-paper threshold FTH "249" as a trailing-end threshold TTH (RH3).

The CPU 30 repeatedly performs the processes RH5 to RH9, thereby detecting a document trailing-end position OTP in each position of the 670$^{th}$-pixel position to the 501$^{st}$-pixel position in the main scanning direction. The CPU 30 sets, as a group of upstream target pixels, 21 pixels including a third reference pixel, 10 upstream pixels, and 10 downstream pixels (RH5). It is noted that the third reference pixel is adjacent to an upstream end, in the main scanning direction, of a pixel located in the document trailing-end position OTP in the 501$^{st}$-pixel position in the main scanning direction. The 10 upstream pixels are successively-arranged pixels adjacent to an upstream end of the third reference pixel in the sub scanning direction. The 10 downstream pixels are successively-arranged pixels adjacent to a downstream end of the third reference pixel in the sub scanning direction. In other words, the third reference pixel is located in the 500$^{th}$-pixel position in the main scanning direction, and is adjacent to an upstream end, in the main scanning direction, of a pixel located in the document trailing-end position OTP, which is the 501$^{st}$-pixel position in the main scanning direction and the 2585$^{th}$-pixel position in the sub scanning direction. The 10 upstream pixels are successively arranged on the upstream end of the 2585$^{th}$ pixel in the sub scanning direction, in the 500$^{th}$-pixel position in the main scanning direction. The 10 downstream pixels are successively arranged on the downstream end of the 2585$^{th}$ pixel in the sub scanning direction, in the 500$^{th}$-pixel position in the main scanning direction. Namely, in the process RH5, in the 500$^{th}$-pixel position in the main scanning direction, the 2575$^{th}$ to 2595$^{th}$ pixels in the sub scanning direction are set as the group of the upstream target pixels.

The CPU 30 sets, a target pixel, the 2575$^{th}$ pixel in the sub scanning direction that is the most upstream pixel in the sub scanning direction among the group of the upstream target pixels (RH6). The CPU 30 determines that the gradation value GV "240" of the target pixel is less than the trailing-end threshold TTH "249" (RH7: No), and goes to the process RH6. With respect to the 2576$^{th}$ pixel to the 2586$^{th}$ pixel in the sub scanning direction, the gradation values GV thereof are less than 249. Therefore, in the process RH7 for each of those pixels as a target pixel, the CPU 30 determines that the gradation value GV of the target pixel is less than the trailing-end threshold TTH (RH7: No). Hence, the CPU 30 repeatedly performs the processes RH6 to RH9.

The CPU 30 sets, as a target pixel, the 2587$^{th}$ pixel in the sub scanning direction that is adjacent to a downstream end of the 2586$^{th}$ pixel in the sub scanning direction (RH6). The CPU 30 determines that the gradation value GV "255" of the target pixel is equal to or more than the trailing-end threshold TTH (RH7: Yes). The CPU 30 stores, into the RAM 32, the 500$^{th}$-pixel position in the main scanning direction and the 2587$^{th}$-pixel position in the sub scanning direction as a document trailing-end position OTP (RH8).

<Advantageous Effects of Illustrative Embodiment>

In the illustrative embodiment, in the black edge detecting process RA2, the CPU 30 calculates the background color average BGAV by averaging gradation values GV of 100 pixels successively arranged in the downstream direction along the sub scanning direction from a specific pixel that is located 100 pixels away from the document leading-end position OHP in the downstream direction along the sub scanning direction, in the target determination position in the main scanning direction. In the document leading-end detecting process RA6, the CPU 30 calculates, as a black edge value deviation BED, a standard deviation of all black edge values BEV including the black edge value BEV stored in the process RC 14, the black edge values BEV stored in the process RDS, and the black edge values BEV stored in the process RD10. In the document detecting process R6, the CPU 30 determines whether the background color average BGAV is equal to or more than the white determination value WDV. When determining that the background color average BGAV is less than the white determination value WDV, the CPU 30 performs the background color edge detecting process RA9. When determining that the background color average BGAV is equal to or more than the white determination value WDV, the CPU 30 determines whether the black edge value deviation BED is equal to or more than the sheet type threshold OTH. When determining that the black edge value deviation BED is equal to or more than the sheet type threshold OTH, the CPU 30 performs the thin-paper white edge detecting process RA12. When determining that the black edge value deviation BED is less than the sheet type threshold OTH, the CPU 30 performs the thick-paper white edge detecting process RA14. Thus, the CPU 30 determines whether the sheet type of the document sheet is a thin paper, based on the black edge value deviation BED, using features that the black edge values BEV vary greatly when the document sheet is a thin paper. Then, when the sheet type of the document sheet is a thin paper, the CPU 30 performs the thin-paper white edge detecting process RA12. Therefore, even though the document sheet has a portion through which a large quantity of light may be transmitted, near an end of the document sheet, the CPU 30 may accurately detect positions of white pixels. Further, the CPU 30 may accurately determine which process to perform among the white edge detecting processes, without obtaining additional information having no connection with end portions of the document sheet.

In the cover color deviation calculating process RA1, the CPU 30 calculates the first cover color average CC1 by averaging gradation values GV of all pixels included in the first cover color area RCR1. Further, the CPU 30 calculates the second cover color average CC2 by averaging gradation values GV of all pixels included in the second cover color area RCR2. Further, the CPU 30 calculates the third cover color average CC3 by averaging gradation values GV of all pixels included in the third cover color area RCR3. Further, the CPU 30 calculates the fourth cover color average CC4 by averaging gradation values GV of all pixels included in the fourth cover color area RCR4. Further, the CPU 30 determines whether the first cover color average CC1, the second cover color average CC2, and the third cover color average CC3 are within the particular range. When determining that the first cover color average CC1, the second cover color average CC2, and the third cover color average CC3 are within the particular range, the CPU 30 calculates the cover color average CCAV and the cover color deviation CCD from the first cover color area RCR1, the second cover color area RCR2, and the third cover color area RCR3. When determining that the first cover color average CC1, the second cover color average CC2, and the third cover color average CC3 are not within the particular range, the CPU 30 determines whether the first cover color average CC1, the second cover color average CC2, and the fourth cover color average CC4 are within the particular range. When determining that the first cover color average CC1, the second cover color average CC2, and the fourth cover color average CC4 are within the particular range, the CPU 30 calculates the cover color average CCAV and the cover color deviation CCD from the first cover color area RCR1, the second cover color area RCR2, and the fourth cover color area RCR4. When determining that the first cover color average CC1, the second cover color average CC2, and the fourth cover color average CC4 are not within the particular range, the CPU 30 determines whether the first cover color average CC1, the third cover color average CC3, and the fourth cover color average CC4 are within the particular range. When determining that the first cover color average CC1, the third cover color average CC3, and the fourth cover color average CC4 are within the particular range, the CPU 30 calculates the cover color average CCAV and the cover color deviation CCD from the first cover color area RCR1, the third cover color area RCR3, and the fourth cover color area RCR4. When determining that the first cover color average CC1, the third cover color average CC3, and the fourth cover color average CC4 are not within the particular range, the CPU 30 calculates the cover color average CCAV and the cover color deviation CCD from the second cover color area RCR2, the third cover color area RCR3, and the fourth cover color area RCR4. The CPU 30 calculates the first black threshold BTH1 by subtracting the cover color deviation CCD multiplied by two from the cover color average CCAV. Thus, the first black threshold BTH1 is calculated from the cover color average CCAV and the cover color deviation CCD. Thereby, it is possible to accurately detect the white edge having gradation values GV larger than the cover color average CCAV.

In the black edge detecting process RA2, the CPU 30 sets, as a new target pixel, a pixel adjacent to a downstream end of the current target pixel in the sub scanning direction in the target determination position in the main scanning direction. The CPU 30 determines whether a gradation value GV of the target pixel is less than the black edge minimum value BEMN. When determining that the gradation value GV of the target pixel is less than the black edge minimum value BEMN, the CPU 30 stores the gradation value GV of the target pixel as a black edge minimum value BEMN. When determining that the gradation value GV of the target pixel is equal to or more than the black edge minimum value BEMN, the CPU 30 calculates a first minimum difference value MNDV1. When determining that the first minimum difference value MNDV1 is equal to or more than the first black threshold BTH1, the CPU 30 stores, into the RAM 32, a position of a pixel corresponding to a pixel number SPN associated with the black edge minimum value BEMN, as a document leading-end position OHP in the sub scanning direction. Thus, the CPU 30 may store the document leading-end positions OHP, without determining whether the first minimum difference value MNDV1 is equal to or more than the first black threshold BTH1 with respect to each of all the pixels located in the target determination position.

In the document leading-end detecting process RA6, the CPU 30 sets, as a group of upstream target pixels, 21 pixels including a first reference pixel, 10 upstream pixels, and 10 downstream pixels. The first reference pixel is adjacent to an upstream end, in the main scanning direction, of the most upstream one of document leading-end positions OHP in the main scanning direction. The 10 upstream pixels are successively-arranged pixels adjacent to an upstream end of the first reference pixel in the sub scanning direction. The 10 downstream pixels are successively-arranged pixels adjacent to a downstream end of the first reference pixel in the sub scanning direction. The CPU 30 detects the minimum value of gradation values GV of the 21 upstream target pixels. The CPU 30 calculates a second minimum difference value MNDV2 by subtracting the detected minimum value from the cover color average CCAV. The CPU 30 determines whether the second minimum difference value MNDV2 is equal to or more than the first black threshold BTH1. When determining that the second minimum difference value MNDV2 is equal to or more than the first black threshold BTH1, the CPU 30 stores, into the RAM 32, a position of a pixel having the detected minimum value as a document leading-end position OHP. The CPU 30 sets, as a group of downstream target pixels, 21 pixels including a second reference pixel, 10 upstream pixels, and 10 downstream pixels. The second reference pixel is adjacent to a downstream end, in the main scanning direction, of the most downstream one of document leading-end positions OHP in the main scanning direction. The 10 upstream pixels are successively-arranged pixels adjacent to an upstream end of the second reference pixel in the sub scanning direction. The 10 downstream pixels are successively-arranged pixels adjacent to a downstream end of the second reference pixel in the sub scanning direction. The CPU 30 detects the minimum value of gradation values GV of the 21 downstream target pixels. The CPU 30 calculates a third minimum difference value MNDV3 by subtracting the detected minimum value from the cover color average CCAV. The CPU 30 determines whether the third minimum difference value MNDV3 is equal to or more than the first black threshold BTH1. When determining that the third minimum difference value MNDV3 is equal to or more than the first black threshold BTH1, the CPU 30 stores, into the RAM 32, a position of a pixel having the detected minimum value as a document leading-end position OHP. Thus, the CPU 30 may detect the document leading-end positions OHP from among the upstream target pixels and the downstream target pixels that are adjacent to the previously-detected document leading-end positions OHP in the main scanning direction, without determining whether the second minimum difference value MNDV2 or the third minimum difference value MNDV3 is equal to or more than the first black threshold BTH1 with respect to each of all the pixels included in a single page. Thereby, it is possible to quickly detect the document leading-end positions OHP.

In the thin-paper white edge detecting process RA12, the CPU 30 calculates a first white threshold WTH1 by adding the cover color deviation CCD to the cover color average CCAV. The CPU 30 calculates a second white threshold WTH2 by adding the background color deviation BGD to the background color average BGAV. In the end determination position EDP in the main scanning direction, the CPU 30 sets, a new target pixel, a pixel adjacent to an upstream end of the current target pixel in the sub scanning direction. The CPU 30 determines whether a gradation value GV of the target pixel is equal to or more than the first white threshold WTH1. When determining that the gradation value GV of the target pixel is equal to or more than the first white threshold WTH1, the CPU 30 increments the first white count value WCT1 by one. The CPU 30 determines whether the first white count value WCT1 is equal to or more than 7. When determining that the first white count value WCT1 is less than 7, the CPU 30 again sets a target pixel. When determining that the first white count value WCT1 is equal to or more than 7, the CPU 30 stores, into the RAM 32, the gradation value GV of the target pixel as a thin-paper threshold FTH. In the end determination position EDP in the main scanning direction, the CPU 30 sets, a new target pixel, a pixel adjacent to an upstream end of the current target pixel in the sub scanning direction. The CPU 30 determines whether a gradation value GV of the target pixel is equal to or more than the second white threshold WTH2. When determining that the gradation value GV of the target pixel is less than the second white threshold WTH2, the CPU 30 stores, into the RAM 32, a position of the target pixel as a document trailing-end position OTP. Thus, the CPU 30 may store the document trailing-end position OTP, without determining whether the gradation value GV of the target pixel is equal to or more than the first white threshold WTH1 or the second white threshold WTH2 with respect to each of all the pixels located in the end determination position EDP.

In the thick-paper white edge detecting process RA14, the CPU 30 sets, a new target pixel, a pixel adjacent to an upstream end of the current target pixel in the sub scanning direction, in the end determination position EDP. The CPU 30 determines whether a gradation value GV of the target pixel is the maximum value. When determining that the gradation value GV of the target pixel is the maximum value, the CPU 30 increments the second white count value WCT2 by one. The CPU 30 determines whether the second white count value WCT2 is equal to or more than 3. When determining that the second white count value WCT2 is less than 3, the CPU 30 again sets a target pixel. When determining that the second white count value WCT2 is equal to or more than 3, the CPU 30 sets, a new target pixel, a pixel adjacent to an upstream end of the current target pixel in the sub scanning direction, in the end determination position EDP. The CPU 30 determines whether a gradation value GV of the target pixel is equal to or more than the third white threshold WTH3. When determining that the gradation value GV of the target pixel is less than the third white threshold WTH3, the CPU 30 stores, into the RAM 32, a position of the target pixel as a document trailing-end position OTP. Thus, the CPU 30 may store the document trailing-end position OTP, without determining whether the gradation value GV of the target pixel is the maximum value or equal to or more than the third white threshold WTH3 with respect to each of all the pixels located in the end determination position EDP.

In the document trailing-end detecting process RA16, the CPU 30 determines which value the edge type flag EF is. When the edge type flag EF is 0, the CPU 30 sets the background color threshold BGTH as a trailing-end threshold TTH. When the edge type flag EF if 1, the CPU 30 sets the thin-paper threshold FTH as a trailing-end threshold TTH. When the edge type flag EF is 3, the CPU 30 sets the third white threshold WTH3 as a trailing-end threshold TTH. The CPU 30 sets, as a group of upstream target pixels, 21 pixels including a third reference pixel, 10 upstream pixels, and 10 downstream pixels. The third reference pixel is adjacent to an upstream end, in the main scanning direction, of a pixel located in the most upstream one of document trailing-end positions OTP in the main scanning direction. The 10 upstream pixels are successively-arranged pixels adjacent to an upstream end of the third reference pixel in the sub scanning direction. The 10 downstream pixels are successively-arranged pixels adjacent to a downstream end of the third reference pixel in the sub scanning direction. The CPU 30 sets, as a new target pixel, a pixel adjacent to a downstream end of a current target pixel in the sub scanning direction, sequentially in an order from the most upstream pixel in the sub scanning direction among the group of the upstream target pixels. The CPU 30 determines whether a gradation value GV of the target pixel is equal to or more than the trailing-end threshold TTH. When determining that the gradation value GV of the target pixel is equal to or more than the trailing-end threshold TTH, the CPU 30 stores, into the RAM 32, a position of the target pixel as a document trailing-end position OTP. In this case, the CPU 30 again sets a group of upstream target pixels. Meanwhile, when determining that the gradation value GV of the target pixel is less than the trailing-end threshold TTH, the CPU 30 determines whether the target pixel is the most downstream pixel in the sub scanning direction among the group of the upstream target pixels. When determining that the target pixel is not the most downstream pixel in the sub scanning direction among the group of the upstream target pixels, the CPU 30 again sets a target pixel. When determining that the target pixel is the most downstream pixel in the sub scanning direction among the group of the upstream target pixels, the CPU 30 sets, as a group of downstream target pixels, 21 pixels including a fourth reference pixel, 10 upstream pixels, and 10 downstream pixels. The fourth reference pixel is adjacent to a downstream end, in the main scanning direction, of a pixel located in the most downstream one of document trailing-end positions OTP in the main scanning direction. The 10 upstream pixels are successively-arranged pixels adjacent to an upstream end of the fourth reference pixel in the sub scanning direction. The 10 downstream pixels are successively-arranged pixels adjacent to a downstream end of the fourth reference pixel in the sub scanning direction. The CPU 30 sets, as a new target pixel, a pixel adjacent to a downstream end of a current target pixel in the sub scanning direction, sequentially in an order from the most upstream pixel in the sub scanning direction among the group of the downstream target pixels. The CPU 30 determines whether a gradation value GV of the target pixel is equal to or more than the trailing-end threshold TTH. When determining that the gradation value GV of the target pixel is equal to or more than the trailing-end threshold TTH, the CPU 30 stores, into the RAM 32, a position of the target pixel as a document trailing-end position OTP. Thus, the CPU 30 may detect the document trailing-end positions OTP from among the upstream target pixels and the downstream target pixels that are adjacent to the previously-detected document trailing-end positions OTP in the main scanning direction, without determining whether the gradation value GV of the target pixel is equal to or more than the trailing-end threshold TTH with respect to each of all the pixels included in a single page. Thereby, it is possible to quickly detect the document trailing-end positions OTP.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of its versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

The image scanning apparatus SM according to aspects of the present disclosure may be applied to a multi-function peripheral including a printer. In the aforementioned illustrative embodiment, the image scanner 20 including the CIS has been exemplified. Nonetheless, the image scanner 20 may include a CCD unit configured to move along the sub scanning direction with a CCD mounted thereon, or may include a scanning unit having an image sensor configured such that only a light source and a mirror are movable along the sub scanning direction.

In the aforementioned illustrative embodiment, an example has been described in which the light source 21 is configured to emit light in such a direction that the black edge is produced at the leading end of the document sheet and that the white edge is produced at the trailing end thereof. Nonetheless, the light source 21 may be configured to emit light in such a direction that the white edge is produced at the leading end of the document sheet and that the black edge is produced at the trailing end thereof.

In the aforementioned illustrative embodiment, the cover color average CCAV and the cover color deviation CCD are calculated using pixels included in the first cover color area RCR1, the second cover color area RCR2, the third cover color area RCR3, and the fourth cover color area RCR4. Nonetheless, the cover color average CCAV and the cover color deviation CCD may be calculated using pixels included in other areas on which there is no document sheet placed.

In the aforementioned illustrative embodiment, the black edge detecting process RA2 is performed in the first determination position DP1, the second determination position DP2, and the third determination position DP3. Nonetheless, the black edge detecting process RA2 may be performed in other positions in the main scanning direction.

In the aforementioned illustrative embodiment, each kind of deviation is calculated using a standard deviation. Nonetheless each kind of deviation may be calculated using not a standard deviation but another deviation representing a value variation.

In the aforementioned illustrative embodiment, the document detecting process R6 is performed using the gradation values GV of a single page that are obtained by scanning the maximum scanning range in the process R5. Nonetheless, the document detecting process R6 may be performed using gradation values GV of a single page that are obtained by scanning not the maximum scanning range but another range in which the document sheet is placed.

In the aforementioned illustrative embodiment, in the process R5, the CPU 30 obtains the gradation values GV of a single page as an image for document detection by controlling the light source 21 to emit green light with the document detection light quantity ST2. Nonetheless, the CPU 30 may obtain the gradation values GV of a single page as an image for document detection by controlling the light source 21 to emit red light and blue light as well as green light.

In the aforementioned illustrative embodiment, in the process RF2, the CPU 30 determines whether the gradation value GV of the target pixel is the maximum value. Nonetheless, in the process RF2, the CPU 30 may determine whether the gradation value GV of the target pixel is equal to or more than 250.

Associations between elements exemplified in the aforementioned illustrative embodiment and elements to be defined according to aspects of the present disclosure will be exemplified below. The document table DT may be an example of a "document table" according to aspects of the present disclosure. The document cover CV may be an example of a "document pressing member" according to aspects of the present disclosure. The image reader 20 may be an example of an "image reader" according to aspects of the present disclosure. The CPU 30 and the ROM 31 storing the programs 31A may be included in a "controller" according to aspects of the present disclosure. The process R5 may be an example of an "image data acquiring process" according to aspects of the present disclosure. The process RA5 and the process RA6 may be included in a "black edge detecting process" according to aspects of the present disclosure. The process RA10 and the process RD11 may be included in a "determining process" according to aspects of the present disclosure. The process RA12, the process RA14, and the process RA16 may be included in a "white edge detecting process" according to aspects of the present disclosure. The process RB 1, the process RB2, the process RB3, and the process RB4 may be included in a "corner average calculating process" according to aspects of the present disclosure. The process RB5, the process RB8, and the process RB11 may be included in a "corner average selecting process" according to aspects of the present disclosure. The process RB6, the process RB9, the process RB12, and the process RB14 may be included in a "white average calculating process" according to aspects of the present disclosure. The process RB7, the process RB10, the process RB13, and the process RB 15 may be included in a "white deviation calculating process" according to aspects of the present disclosure. The process RE1 may be an example of a "first threshold calculating process" according to aspects of the present disclosure. The process RE16 may be an example of a "fourth threshold calculating process" according to aspects of the present disclosure. The process RE2 may be an example of a "fifth threshold calculating process" according to aspects of the present disclosure.

What is claimed is:

1. An image scanning apparatus comprising:
a document table configured to support a document sheet placed thereon;
a document pressing member having a white document pressing surface;
an image scanner comprising a light source and a plurality of light receivers arranged in line along a main scanning direction, the image scanner being configured to scan an image of the document sheet placed on the document table while moving along a sub scanning direction perpendicular to the main scanning direction and generate image data of the scanned image, the image data including a plurality of pixels each having a gradation value, the image scanner being further configured to generate a white gradation value by scanning the white document pressing surface of the document pressing member; and
a controller configured to perform:
an image data acquiring process to acquire single-page image data by controlling the image scanner to scan the document sheet placed on the document table and a particular range of the white document pressing surface, the particular range being wider than a size of the document sheet;
a black edge detecting process to detect black edge positions by detecting, from the single-page image data, positions of black pixels each having a gradation value less than the white gradation value, each black edge position being a position of a specific one of a leading end and a trailing end of the document sheet in the sub scanning direction;
a determining process to determine a sheet type of the document sheet based on the gradation values of the black pixels, the sheet type including a thin paper and a thick paper; and
a white edge detecting process to detect white edge positions by detecting, from the single-page image data, positions of white pixels each having a gradation value equal to or more than the white gradation value, each white edge position being a position of another specific one of the leading end and the trailing end of the document sheet in the sub scanning direction, the white edge detecting process comprising:
a thin-paper white edge detecting process to, when the sheet type is the thin paper, detect, as the white pixels, pixels each having a gradation value equal to or more than a first threshold by determining whether a gradation value of each pixel included in the single-page image data is equal to or more than the first threshold, the first threshold being determined based on the white gradation value; and
a thick-paper white edge detecting process to, when the sheet type is the thick paper, detect, as the white pixels, pixels each having a gradation value equal to or more than a predetermined second threshold by determining whether the gradation value of each pixel included in the single-page image data is equal to or more than the second threshold.

2. The image scanning apparatus according to claim 1, wherein the determining process comprises:

a black edge deviation calculating process to calculate a black edge deviation, the black edge deviation representing a deviation of the gradation values of all the black pixels detected from the single-page image data; and a black edge deviation determining process comprising:
when the black edge deviation is equal to or more than a predetermined third threshold, determining that the sheet type of the document sheet is the thin paper; and
when the black edge deviation is less than the third threshold, determining that the sheet type of the document sheet is the thick paper.

3. The image scanning apparatus according to claim 2, wherein the controller is further configured to perform:
a corner average calculating process to calculate four corner averages, each corner average being obtained by averaging gradation values of a plurality of pixels in a corresponding one of four corner areas of the document table;
a corner average selecting process to select three of the four corner averages;
a white average calculating process to calculate the white gradation value by averaging the selected three corner averages;
a white deviation calculating process to calculate a white deviation, the white deviation representing a deviation of the gradation values of all the pixels included in three corner areas corresponding to the selected three corner averages; and
a first threshold calculating process to calculate the first threshold by adding the white deviation to the white gradation value,
wherein the second threshold is a maximum value of gradation values generable by the image scanner, and
wherein the third threshold is substantially 2% of a count of gradations from a minimum gradation value to the maximum gradation value of the gradation values generable by the image scanner.

4. The image scanning apparatus according to claim 3,
wherein a downstream direction along the main scanning direction is a direction from a head pixel toward a final pixel of a single line,
wherein a downstream direction along the sub scanning direction is a direction from a scanning start position toward a scanning end position of the image scanner,
wherein the controller is further configured to calculate a fourth threshold by subtracting the white deviation multiplied by two from the white gradation value,
wherein the light source is configured to emit light in an upstream direction along the sub scanning direction,
wherein the black edge detecting process comprises:
a first black edge detecting process to detect, as a first black edge position, a black edge position in a particular position in the main scanning direction, by detecting a black pixel in the downstream direction along the sub scanning direction from a first pixel in the particular position;
a second black edge detecting process to detect black edge positions in an upstream direction along the main scanning direction from the pixel located in the first black edge position in the sub scanning direction and in the particular position in the main scanning direction; and
a third black edge detecting process to detect black edge positions in the downstream direction along the main scanning direction from the pixel located in the first black edge position in the sub scanning direction and in the particular position in the main scanning direction, and wherein the first black edge detecting process comprises:
a target black edge pixel setting process to sequentially set, as a new target black edge pixel, a pixel adjacent to a downstream end of a current target black edge pixel in the sub scanning direction, the target black edge pixel setting process comprising:
when initially setting a target black edge pixel, setting a first pixel in the particular position as the target black edge pixel, and setting, as a black edge detection value, the maximum gradation value of the gradation values generable by the image scanner;
a black edge detection value determining process to determine whether a gradation value of the target black edge pixel is less than the black edge detection value;
a black edge detection value storing process to, when the gradation value of the target black edge pixel is less than the black edge detection value, store the gradation value of the target black edge pixel as the black edge detection value in association with a pixel number, and again perform the target black edge pixel setting process, the pixel number representing a position of the target black edge pixel in the sub scanning direction;
a black edge difference value calculating process to, when the gradation value of the target black edge pixel is equal to or more than the black edge detection value, calculate a black edge difference value by subtracting the black edge detection value from the white gradation value;
a black edge difference value determining process comprising:
when the black edge difference value is equal to or more than the fourth threshold, determining the pixel corresponding to the black edge detection value as a black pixel, and detecting the position represented by pixel number, as the first black edge position; and
when the black edge difference value is less than the fourth threshold, determining that the pixel corresponding to the black edge detection value is not a black pixel, and again performing the target black edge pixel setting process;
a background color average calculating process to calculate a background color average by averaging background color gradation values, the background color gradation values being gradation values of a first number of pixels successively arranged from a specific pixel in the downstream direction along the sub scanning direction, the specific pixel being located the first number of pixels away, in the downstream direction along the sub scanning direction, from the first black end position in the particular position; and
a background color deviation calculating process to calculate a background color deviation, the background color deviation representing a deviation of the background color gradation values of the pixels of the first number.

5. The image scanning apparatus according to claim 4,
wherein the second black edge detecting process comprises:

a first target black edge pixel group setting process to set a group of first target black edge pixels including:
  a first reference pixel adjacent to an upstream end, in the main scanning direction, of a pixel located in a most-upstream black edge position in the main scanning direction among already-detected one or more black edge positions, the first black edge position being initially set as the most-upstream black edge position;
  a second number of pixels adjacent to an upstream end of the first reference pixel in the sub scanning direction; and
  the second number of pixels adjacent to a downstream end of the first reference pixel in the sub scanning direction;
a first difference value calculating process to calculate a first difference value by subtracting a first minimum value from the white gradation value, the first minimum value being a minimum value of gradation values of the first target black edge pixels; and
a first difference value determining process comprising:
  determining whether the first difference value is equal to or more than the fourth threshold;
  when the first difference value is equal to or more than the fourth threshold, setting a position of a pixel having the first minimum value as the most-upstream black edge position in the main scanning direction; and
  re-performing the first target black edge pixel group setting process, and
wherein the third black edge detecting process comprises:
  a second target black edge pixel group setting process to set a group of second target black edge pixels including:
    a second reference pixel adjacent to a downstream end, in the main scanning direction, of a pixel located in a most-downstream black edge position in the main scanning direction among already-detected one or more black edge positions, the first black edge position being initially set as the most-downstream black edge position;
    the second number of pixels adjacent to an upstream end of the second reference pixel in the sub scanning direction; and
    the second number of pixels adjacent to a downstream end of the second reference pixel in the sub scanning direction;
  a second difference value calculating process to calculate a second difference value by subtracting a second minimum value from the white gradation value, the second minimum value being a minimum value of gradation values of the second target black edge pixels; and
  a second difference value determining process comprising:
    determining whether the second difference value is equal to or more than the fourth threshold;
    when the second difference value is equal to or more than the fourth threshold, setting a position of a pixel having the second minimum value as the most-downstream black edge position in the main scanning direction; and
    re-performing the second target black edge pixel group setting process.

6. The image scanning apparatus according to claim 5, wherein the controller is further configured to perform a fifth threshold calculating process to calculate a fifth threshold by adding the background color deviation to the background color average,
wherein the thin-paper white edge detecting process comprises:
  a first white edge detecting process to detect, as a first white edge position, a position of a white pixel having a gradation value equal to or more than the first threshold, in the upstream direction along the sub scanning direction from a final pixel in the sub scanning direction in the particular position, the first white edge position being a white edge position in the particular position;
  a second white edge detecting process to detect white edge positions in the upstream direction along the main scanning direction from the pixel located in the first white edge position in the sub scanning direction and in the particular position in the main scanning direction; and
  a third white edge detecting process to detect white edge positions in the downstream direction along the main scanning direction from the pixel located in the first white edge position in the sub scanning direction and in the particular position in the main scanning direction,
wherein the first white edge detecting process comprises:
  a first white edge start position detecting process comprising:
    determining whether every pixel of a third number of pixels successively arranged in the sub scanning direction has a gradation value equal to or more than the first threshold, in the upstream direction along the sub scanning direction, sequentially in an order from the final pixel in the sub scanning direction in the particular position; and
    when every pixel of the third number of pixels successively arranged in the sub scanning direction has a gradation value equal to or more than the first threshold, detecting, as a first white edge start position, a position of a most-upstream pixel in the sub scanning direction among the third number of the pixels;
  a thin-paper threshold acquiring process to acquire, as a thin-paper threshold, the gradation value of the pixel located in the first white edge start position in the sub scanning direction and in the particular position in the main scanning direction; and
  a first white edge end position detecting process comprising:
    determining whether each individual pixel has a gradation value less than the fifth threshold, in the upstream direction along the sub scanning direction, sequentially in an order from the pixel located in the first white edge start position in the sub scanning direction and in the particular position in the main scanning direction; and
    when a pixel has a gradation value less than the fifth threshold, detecting, as a first white edge end position, a position of the pixel having the gradation value less than the fifth threshold,
wherein the white pixels are located from the first white edge start position to the first white edge end position, and
wherein the first white edge end position is the first white edge position.

7. The image scanning apparatus according to claim 6, wherein the thick-paper white edge detecting process comprises:

a fourth white edge detecting process to detect, as the first white edge position, a position of a white pixel having a gradation value equal to or more than the second threshold, in the upstream direction along the sub scanning direction from the final pixel in the sub scanning direction in the particular position;
the second white edge detecting process; and
the third white edge detecting process,
wherein the fourth white edge detecting process comprises:
a second white edge start position detecting process comprising:
determining whether every pixel of a fourth number of pixels successively arranged in the sub scanning direction has a gradation value equal to or more than the second threshold, in the upstream direction along the sub scanning direction, sequentially in an order from the final pixel in the sub scanning direction in the particular position; and
when every pixel of the third number of pixels successively arranged in the sub scanning direction has a gradation value equal to or more than the second threshold, detecting, as a second white edge start position, a position of a most-upstream pixel in the sub scanning direction among the fourth number of the pixels; and
a second white edge end position detecting process comprising:
determining whether each individual pixel has a gradation value less than a sixth threshold, the sixth threshold being substantially 98% of the count of gradations from the minimum gradation value to the maximum gradation value, in the upstream direction along the sub scanning direction, sequentially in an order from the pixel located in the second white edge start position in the sub scanning direction and in the particular position in the main scanning direction; and
when a pixel has a gradation value less than the sixth threshold, detecting, as a second white edge end position, a position of the pixel having the gradation value less than the sixth threshold,
wherein the white pixels are located from the second white edge start position to the second white edge end position, and
wherein the second white edge end position is the first white edge position.

8. The image scanning apparatus according to claim 7, wherein the second white edge detecting process comprises:
a threshold setting process comprising:
when the sheet type is the thin paper, setting the thin-paper threshold as a white edge threshold; and
when the sheet type is the thick paper, setting the sixth threshold as the white edge threshold;
a first target white edge pixel group setting process to set a group of first target white edge pixels including:
a third reference pixel adjacent to an upstream end, in the main scanning direction, of a pixel located in a most-upstream white edge position in the main scanning direction among already-detected one or more white edge positions, the first white edge position being initially set as the most-upstream white edge position;
the second number of pixels adjacent to an upstream end of the third reference pixel in the sub scanning direction; and
the second number of pixels adjacent to a downstream end of the third reference pixel in the sub scanning direction;
a first target white edge determining process comprising:
determining whether each individual pixel has a gradation value equal to or more than the white edge threshold, in the downstream direction along the sub scanning direction, sequentially in an order from a most-upstream pixel in the sub scanning direction among the first target white edge pixels; and
when a pixel has a gradation value equal to or more than the white edge threshold, setting a position of the pixel having the gradation value equal to or more than the white edge threshold as the most-upstream white edge position in the main scanning direction, and
wherein the third white edge detecting process comprises:
a second white edge pixel group setting process to set a group of second target white edge pixels including:
a fourth reference pixel adjacent to a downstream end, in the main scanning direction, of a pixel located in a most-downstream white edge position in the main scanning direction among already-detected one or more white edge positions, the first white edge position being initially set as the most-downstream white edge position;
the second number of pixels adjacent to an upstream end of the fourth reference pixel in the sub scanning direction; and
the second number of pixels adjacent to a downstream end of the fourth reference pixel in the sub scanning direction; and
a second target white edge determining process comprising:
determining whether each individual pixel has a gradation value equal to or more than the white edge threshold, in the downstream direction along the sub scanning direction, sequentially in an order from a most-upstream pixel in the sub scanning direction among the second target white edge pixels; and
when a pixel has a gradation value equal to or more than the white edge threshold, setting a position of the pixel having the gradation value equal to or more than the white edge threshold as the most-downstream white edge position in the main scanning direction.

9. The image scanning apparatus according to claim 1, wherein the controller comprises:
a processor; and
a memory storing processor-executable instructions configured to, when executed by the processor, cause the processor to perform the image data acquiring process, the black edge detecting process, the determining process, and the white edge detecting process.

10. A method implementable on a processor coupled with an image scanning apparatus, the image scanning apparatus comprising:
a document table configured to support a document sheet placed thereon;

a document pressing member having a white document pressing surface; and an image scanner comprising a light source and a plurality of light receivers arranged in line along a main scanning direction, the image scanner being configured to scan an image of the document sheet placed on the document table while moving along a sub scanning direction perpendicular to the main scanning direction and generate image data of the scanned image, the image data including a plurality of pixels each having a gradation value, the image scanner being further configured to generate a white gradation value by scanning the white document pressing surface of the document pressing member, the method comprising:

acquiring single-page image data by controlling the image scanner to scan the document sheet placed on the document table and a particular range of the white document pressing surface, the particular range being wider than a size of the document sheet;

detecting black edge positions by detecting, from the single-page image data, positions of black pixels each having a gradation value less than the white gradation value, each black edge position being a position of a specific one of a leading end and a trailing end of the document sheet in the sub scanning direction;

determining whether a sheet type of the document sheet is a thin paper or a thick paper, based on the gradation values of the black pixels;

detecting white edge positions by detecting, from the single-page image data, positions of white pixels each having a gradation value equal to or more than the white gradation value, each white edge position being a position of another specific one of the leading end and the trailing end of the document sheet in the sub scanning direction;

when determining that the sheet type is the thin paper, detecting, as the white pixels, pixels each having a gradation value equal to or more than a first threshold by determining whether a gradation value of each pixel included in the single-page image data is equal to or more than the first threshold, the first threshold being determined based on the white gradation value; and when determining that the sheet type is the thick paper, detecting, as the white pixels, pixels each having a gradation value equal to or more than a predetermined second threshold by determining whether the gradation value of each pixel included in the single-page image data is equal to or more than the second threshold.

11. A non-transitory computer-readable medium storing computer-readable instructions that are executable by a processor coupled with an image scanning apparatus, the image scanning apparatus comprising:

a document table configured to support a document sheet placed thereon;

a document pressing member having a white document pressing surface; and an image scanner comprising a light source and a plurality of light receivers arranged in line along a main scanning direction, the image scanner being configured to scan an image of the document sheet placed on the document table while moving along a sub scanning direction perpendicular to the main scanning direction and generate image data of the scanned image, the image data including a plurality of pixels each having a gradation value, the image scanner being further configured to generate a white gradation value by scanning the white document pressing surface of the document pressing member, the instructions being configured to, when executed by the processor, cause the processor to perform:

an image data acquiring process to acquire single-page image data by controlling the image scanner to scan the document sheet placed on the document table and a particular range of the white document pressing surface, the particular range being wider than a size of the document sheet;

a black edge detecting process to detect black edge positions by detecting, from the single-page image data, positions of black pixels each having a gradation value less than the white gradation value, each black edge position being a position of a specific one of a leading end and a trailing end of the document sheet in the sub scanning direction;

a determining process to determine a sheet type of the document sheet based on the gradation values of the black pixels, the sheet type including a thin paper and a thick paper; and a white edge detecting process to detect white edge positions by detecting, from the single-page image data, positions of white pixels each having a gradation value equal to or more than the white gradation value, each white edge position being a position of another specific one of the leading end and the trailing end of the document sheet in the sub scanning direction, the white edge detecting process comprising:

a thin-paper white edge detecting process to, when the sheet type is the thin paper, detect, as the white pixels, pixels each having a gradation value equal to or more than a first threshold by determining whether a gradation value of each pixel included in the single-page image data is equal to or more than the first threshold, the first threshold being determined based on the white gradation value; and a thick-paper white edge detecting process to, when the sheet type is the thick paper, detect, as the white pixels, pixels each having a gradation value equal to or more than a predetermined second threshold by determining whether the gradation value of each pixel included in the single-page image data is equal to or more than the second threshold.

12. The non-transitory computer-readable medium according to claim 11, wherein the determining process comprises:

a black edge deviation calculating process to calculate a black edge deviation, the black edge deviation representing a deviation of the gradation values of all the black pixels detected from the single-page image data; and a black edge deviation determining process comprising:

when the black edge deviation is equal to or more than a predetermined third threshold, determining that the sheet type of the document sheet is the thin paper; and when the black edge deviation is less than the third threshold, determining that the sheet type of the document sheet is the thick paper.

13. The non-transitory computer-readable medium according to claim 12, wherein the instructions are further configured to, when executed by the processor, cause the processor to perform:

a corner average calculating process to calculate four corner averages, each corner average being obtained by averaging gradation values of a plurality of pixels in a corresponding one of four corner areas of the document table;
a corner average selecting process to select three of the four corner averages;
a white average calculating process to calculate the white gradation value by averaging the selected three corner averages;
a white deviation calculating process to calculate a white deviation, the white deviation representing a deviation of the gradation values of all the pixels included in three corner areas corresponding to the selected three corner averages; and
a first threshold calculating process to calculate the first threshold by adding the white deviation to the white gradation value,
wherein the second threshold is a maximum value of gradation values generable by the image scanner, and
wherein the third threshold is substantially 2% of a count of gradations from a minimum gradation value to the maximum gradation value of the gradation values generable by the image scanner.

14. The non-transitory computer-readable medium according to claim 13,
wherein a downstream direction along the main scanning direction is a direction from a head pixel toward a final pixel of a single line,
wherein a downstream direction along the sub scanning direction is a direction from a scanning start position toward a scanning end position of the image scanner,
wherein the instructions are further configured to, when executed by the processor, cause the processor to calculate a fourth threshold by subtracting the white deviation multiplied by two from the white gradation value,
wherein the light source is configured to emit light in an upstream direction along the sub scanning direction,
wherein the black edge detecting process comprises:
a first black edge detecting process to detect, as a first black edge position, a black edge position in a particular position in the main scanning direction, by detecting a black pixel in the downstream direction along the sub scanning direction from a first pixel in the particular position;
a second black edge detecting process to detect black edge positions in an upstream direction along the main scanning direction from the pixel located in the first black edge position in the sub scanning direction and in the particular position in the main scanning direction; and
a third black edge detecting process to detect black edge positions in the downstream direction along the main scanning direction from the pixel located in the first black edge position in the sub scanning direction and in the particular position in the main scanning direction, and
wherein the first black edge detecting process comprises:
a target black edge pixel setting process to sequentially set, as a new target black edge pixel, a pixel adjacent to a downstream end of a current target black edge pixel in the sub scanning direction, the target black edge pixel setting process comprising:
when initially setting a target black edge pixel, setting a first pixel in the particular position as the target black edge pixel, and setting, as a black edge detection value, the maximum gradation value of the gradation values generable by the image scanner;
a black edge detection value determining process to determine whether a gradation value of the target black edge pixel is less than the black edge detection value;
a black edge detection value storing process to, when the gradation value of the target black edge pixel is less than the black edge detection value, store the gradation value of the target black edge pixel as the black edge detection value in association with a pixel number, and again perform the target black edge pixel setting process, the pixel number representing a position of the target black edge pixel in the sub scanning direction;
a black edge difference value calculating process to, when the gradation value of the target black edge pixel is equal to or more than the black edge detection value, calculate a black edge difference value by subtracting the black edge detection value from the white gradation value;
a black edge difference value determining process comprising:
when the black edge difference value is equal to or more than the fourth threshold, determining the pixel corresponding to the black edge detection value as a black pixel, and detecting the position represented by pixel number, as the first black edge position; and
when the black edge difference value is less than the fourth threshold, determining that the pixel corresponding to the black edge detection value is not a black pixel, and again performing the target black edge pixel setting process;
a background color average calculating process to calculate a background color average by averaging background color gradation values, the background color gradation values being gradation values of a first number of pixels successively arranged from a specific pixel in the downstream direction along the sub scanning direction, the specific pixel being located the first number of pixels away, in the downstream direction along the sub scanning direction, from the first black end position in the particular position; and
a background color deviation calculating process to calculate a background color deviation, the background color deviation representing a deviation of the background color gradation values of the pixels of the first number.

15. The non-transitory computer-readable medium according to claim 14,
wherein the second black edge detecting process comprises:
a first target black edge pixel group setting process to set a group of first target black edge pixels including:
a first reference pixel adjacent to an upstream end, in the main scanning direction, of a pixel located in a most-upstream black edge position in the main scanning direction among already-detected one or more black edge positions, the first black edge position being initially set as the most-upstream black edge position;
a second number of pixels adjacent to an upstream end of the first reference pixel in the sub scanning direction; and the second number of pixels adjacent to a downstream end of the first reference pixel in the sub scanning direction;

a first difference value calculating process to calculate a first difference value by subtracting a first minimum value from the white gradation value, the first minimum value being a minimum value of gradation values of the first target black edge pixels; and a first difference value determining process comprising:
determining whether the first difference value is equal to or more than the fourth threshold;
when the first difference value is equal to or more than the fourth threshold, setting a position of a pixel having the first minimum value as the most-upstream black edge position in the main scanning direction; and
re-performing the first target black edge pixel group setting process, and wherein the third black edge detecting process comprises:
a second target black edge pixel group setting process to set a group of second target black edge pixels including:
a second reference pixel adjacent to a downstream end, in the main scanning direction, of a pixel located in a most-downstream black edge position in the main scanning direction among already-detected one or more black edge positions, the first black edge position being initially set as the most-downstream black edge position;
the second number of pixels adjacent to an upstream end of the second reference pixel in the sub scanning direction; and
the second number of pixels adjacent to a downstream end of the second reference pixel in the sub scanning direction;

a second difference value calculating process to calculate a second difference value by subtracting a second minimum value from the white gradation value, the second minimum value being a minimum value of gradation values of the second target black edge pixels; and a second difference value determining process comprising:
determining whether the second difference value is equal to or more than the fourth threshold;
when the second difference value is equal to or more than the fourth threshold, setting a position of a pixel having the second minimum value as the most-downstream black edge position in the main scanning direction; and
re-performing the second target black edge pixel group setting process.

16. The non-transitory computer-readable medium according to claim 15,
wherein the instructions are further configured to, when executed by the processor, cause the processor to perform a fifth threshold calculating process to calculate a fifth threshold by adding the background color deviation to the background color average,
wherein the thin-paper white edge detecting process comprises:
a first white edge detecting process to detect, as a first white edge position, a position of a white pixel having a gradation value equal to or more than the first threshold, in the upstream direction along the sub scanning direction from a final pixel in the sub scanning direction in the particular position, the first white edge position being a white edge position in the particular position;
a second white edge detecting process to detect white edge positions in the upstream direction along the main scanning direction from the pixel located in the first white edge position in the sub scanning direction and in the particular position in the main scanning direction; and
a third white edge detecting process to detect white edge positions in the downstream direction along the main scanning direction from the pixel located in the first white edge position in the sub scanning direction and in the particular position in the main scanning direction,
wherein the first white edge detecting process comprises:
a first white edge start position detecting process comprising:
determining whether every pixel of a third number of pixels successively arranged in the sub scanning direction has a gradation value equal to or more than the first threshold, in the upstream direction along the sub scanning direction, sequentially in an order from the final pixel in the sub scanning direction in the particular position; and
when every pixel of the third number of pixels successively arranged in the sub scanning direction has a gradation value equal to or more than the first threshold, detecting, as a first white edge start position, a position of a most-upstream pixel in the sub scanning direction among the third number of the pixels;
a thin-paper threshold acquiring process to acquire, as a thin-paper threshold, the gradation value of the pixel located in the first white edge start position in the sub scanning direction and in the particular position in the main scanning direction; and
a first white edge end position detecting process comprising:
determining whether each individual pixel has a gradation value less than the fifth threshold, in the upstream direction along the sub scanning direction, sequentially in an order from the pixel located in the first white edge start position in the sub scanning direction and in the particular position in the main scanning direction; and
when a pixel has a gradation value less than the fifth threshold, detecting, as a first white edge end position, a position of the pixel having the gradation value less than the fifth threshold,
wherein the white pixels are located from the first white edge start position to the first white edge end position, and
wherein the first white edge end position is the first white edge position.

17. The non-transitory computer-readable medium according to claim 16,
wherein the thick-paper white edge detecting process comprises:
a fourth white edge detecting process to detect, as the first white edge position, a position of a white pixel having a gradation value equal to or more than the second threshold, in the upstream direction along the sub scanning direction from the final pixel in the sub scanning direction in the particular position;
the second white edge detecting process; and
the third white edge detecting process, wherein the fourth white edge detecting process comprises:
- a second white edge start position detecting process comprising:
  - determining whether every pixel of a fourth number of pixels successively arranged in the sub scanning direction has a gradation value equal to or more than the second threshold, in the upstream direction along the sub scanning direction, sequentially in an order from the final pixel in the sub scanning direction in the particular position; and
  - when every pixel of the third number of pixels successively arranged in the sub scanning direction has a gradation value equal to or more than the second threshold, detecting, as a second white edge start position, a position of a most-upstream pixel in the sub scanning direction among the fourth number of the pixels; and
- a second white edge end position detecting process comprising:
  - determining whether each individual pixel has a gradation value less than a sixth threshold, the sixth threshold being substantially 98% of the count of gradations from the minimum gradation value to the maximum gradation value, in the upstream direction along the sub scanning direction, sequentially in an order from the pixel located in the second white edge start position in the sub scanning direction and in the particular position in the main scanning direction; and
  - when a pixel has a gradation value less than the sixth threshold, detecting, as a second white edge end position, a position of the pixel having the gradation value less than the sixth threshold,
- wherein the white pixels are located from the second white edge start position to the second white edge end position, and
- wherein the second white edge end position is the first white edge position.

18. The non-transitory computer-readable medium according to claim 17,
wherein the second white edge detecting process comprises:
- a threshold setting process comprising:
  - when the sheet type is the thin paper, setting the thin-paper threshold as a white edge threshold; and
  - when the sheet type is the thick paper, setting the sixth threshold as the white edge threshold;
- a first target white edge pixel group setting process to set a group of first target white edge pixels including:
  - a third reference pixel adjacent to an upstream end, in the main scanning direction, of a pixel located in a most-upstream white edge position in the main scanning direction among already-detected one or more white edge positions, the first white edge position being initially set as the most-upstream white edge position;
  - the second number of pixels adjacent to an upstream end of the third reference pixel in the sub scanning direction; and
  - the second number of pixels adjacent to a downstream end of the third reference pixel in the sub scanning direction; and
- a first target white edge determining process comprising:
  - determining whether each individual pixel has a gradation value equal to or more than the white edge threshold, in the downstream direction along the sub scanning direction, sequentially in an order from a most-upstream pixel in the sub scanning direction among the first target white edge pixels; and
  - when a pixel has a gradation value equal to or more than the white edge threshold, setting a position of the pixel having the gradation value equal to or more than the white edge threshold as the most-upstream white edge position in the main scanning direction, and wherein the third white edge detecting process comprises:
- a second white edge pixel group setting process to set a group of second target white edge pixels including:
  - a fourth reference pixel adjacent to a downstream end, in the main scanning direction, of a pixel located in a most-downstream white edge position in the main scanning direction among already-detected one or more white edge positions, the first white edge position being initially set as the most-downstream white edge position;
  - the second number of pixels adjacent to an upstream end of the fourth reference pixel in the sub scanning direction; and
  - the second number of pixels adjacent to a downstream end of the fourth reference pixel in the sub scanning direction; and
- a second target white edge determining process comprising:
  - determining whether each individual pixel has a gradation value equal to or more than the white edge threshold, in the downstream direction along the sub scanning direction, sequentially in an order from a most-upstream pixel in the sub scanning direction among the second target white edge pixels; and
  - when a pixel has a gradation value equal to or more than the white edge threshold, setting a position of the pixel having the gradation value equal to or more than the white edge threshold as the most-downstream white edge position in the main scanning direction.

* * * * *